US009180742B2

(12) United States Patent
Kosugi et al.

(10) Patent No.: US 9,180,742 B2
(45) Date of Patent: Nov. 10, 2015

(54) TIRE POSITION DETERMINATION SYSTEM HAVING TIRE PRESSURE SENSORS AND USING AXLE ROTATION DETECTORS

(71) Applicant: KABUSHIKI KAISHA TOKAI RIKA DENKI SEISAKUSHO, Aichi (JP)

(72) Inventors: Masanori Kosugi, Aichi (JP); Naoki Watanabe, Aichi (JP); Katsuhide Kumagai, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/287,583

(22) Filed: May 27, 2014

(65) Prior Publication Data

US 2014/0354421 A1 Dec. 4, 2014

(30) Foreign Application Priority Data

Jun. 3, 2013 (JP) .................................. 2013-116987
Nov. 25, 2013 (JP) .................................. 2013-243101

(51) Int. Cl.
*G08B 21/00* (2006.01)
*B60C 23/04* (2006.01)

(52) U.S. Cl.
CPC ......... *B60C 23/0416* (2013.01); *B60C 23/0488* (2013.01); *B60C 23/0489* (2013.01)

(58) Field of Classification Search
CPC ............................ B60C 23/0416; B60C 23/02
USPC ........... 340/442–448; 73/146.3, 146.4, 146.5, 73/146.8
See application file for complete search history.

(56) References Cited

U.S. PATENT DOCUMENTS

| 2004/0246117 | A1 | 12/2004 | Ogawa et al. |
| 2005/0248446 | A1 | 11/2005 | Watabe et al. |
| 2006/0001533 | A1 | 1/2006 | Bessho et al. |
| 2006/0087420 | A1 | 4/2006 | Walraet |
| 2010/0147061 | A1 | 6/2010 | Weston |
| 2012/0025968 | A1 | 2/2012 | Maekawa et al. |

(Continued)

FOREIGN PATENT DOCUMENTS

| DE | 102010042198 | 4/2012 |
| EP | 1052119 | 11/2000 |
| EP | 1484200 | 12/2004 |

(Continued)

OTHER PUBLICATIONS

Search report from E.P.O., mail date is Oct. 10, 2014.

(Continued)

*Primary Examiner* — Jeffery Hofsass
(74) *Attorney, Agent, or Firm* — Greenblum & Bernstein P.L.C.

(57) ABSTRACT

A tire position determination system including tire pressure detectors respectively attached to tires, axle rotation detectors respectively corresponding to axles, and a receiver located on a vehicle body. Each tire pressure detector detects when reaching a specific position on a rotation trajectory of the corresponding tire and transmits a radio wave including the tire ID. An ID temporary registration unit temporarily registers tire IDs to the memory that are received from the tire pressure detectors existing in a signal receivable area of the receiver. An ID registration acquires axle rotation information from each axle rotation detector whenever receiving the radio wave from each tire pressure detector, and specifies a tire ID of a tire that rotates in synchronism with rotation of each axle to determine the tire position of the tire.

10 Claims, 11 Drawing Sheets

(56) References Cited

U.S. PATENT DOCUMENTS

| | | |
|---|---|---|
| 2012/0112899 A1 | 5/2012 | Hannon |
| 2012/0203400 A1 | 8/2012 | Schultes |

FOREIGN PATENT DOCUMENTS

| | | |
|---|---|---|
| EP | 1593532 | 11/2005 |
| EP | 2415618 | 2/2012 |
| FR | 2879750 | 6/2006 |
| JP | 2006-015955 | 1/2006 |
| JP | 2012-111481 | 6/2012 |
| JP | 2012-218672 | 11/2012 |
| JP | 2012-224230 | 11/2012 |
| JP | 2013-082436 | 5/2013 |
| WO | 2008/036088 | 3/2008 |
| WO | 2011/045268 | 4/2011 |

OTHER PUBLICATIONS

Japan Office action, mail date is Jun. 2, 2015.

Rotation Trajectory of Tire Pressure Detector

1st Determination Timing t1 n rotation +90-degree rotation (Tu elapsed)

2nd Determination Timing t2

Fig.8
| Tire ID | Corresponding Signal When Vehicle Travels | | Registration | |
|---|---|---|---|---|
| ID-A | Not Available | Receivable in Fixed Intervals | ○ | Spare Tire |
| ID-B | | Not Receivable in Fixed Intervals | × | |
| ID-C | Available | Automatic Location Accomplished | ○ | |
| ID-D | | | ○ | |
| ID-E | | | ○ | |
| ID-F | | | ○ | |
| ID-G | | Not Accomplished | × | |
Fig.9
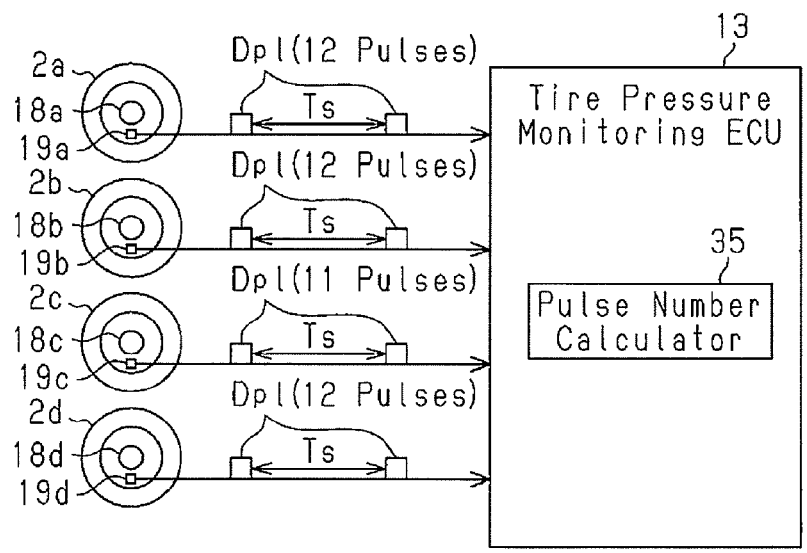
Fig.10
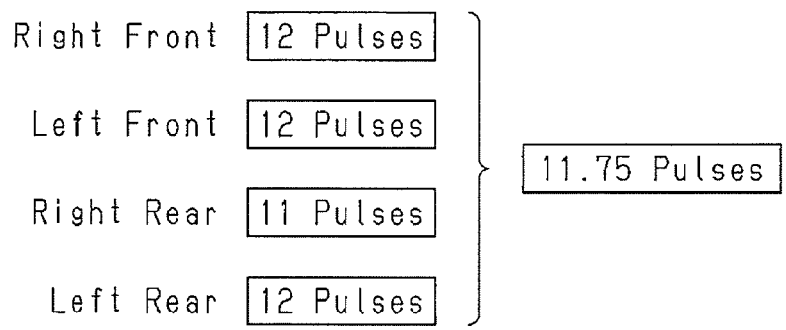

Fig.16
1st Packet
2nd Packet
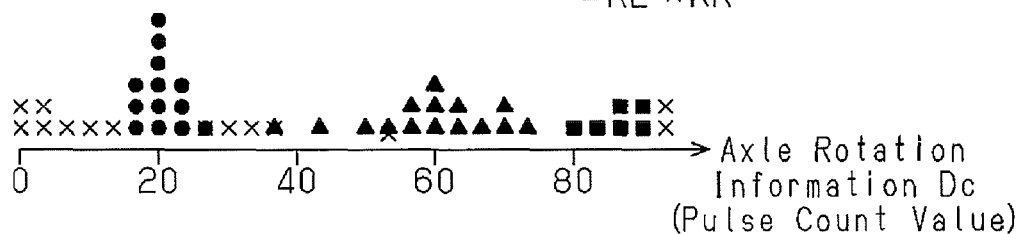
Fig.17
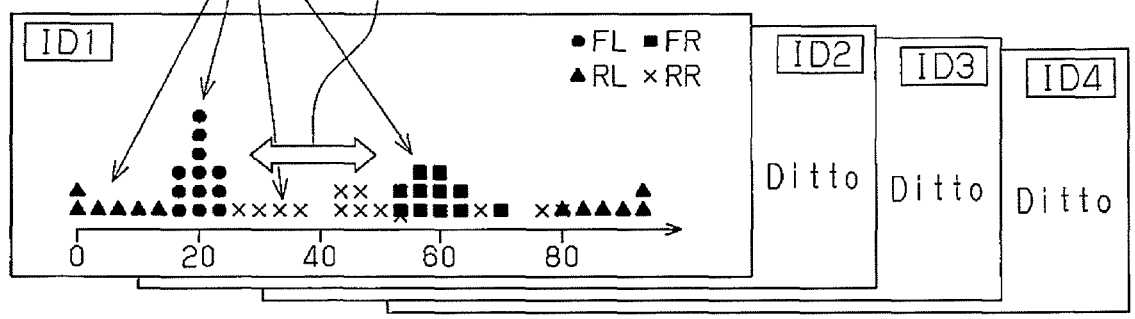
Fig.18
$$\text{Deviation Mean} = \frac{\Sigma (x-x')}{n} \quad \cdots (\alpha)$$
$$\text{Standard Deviation} = \sqrt{\frac{\Sigma (|x-x'|^2)}{n-1}} \quad \cdots (\beta)$$

TIRE POSITION DETERMINATION SYSTEM HAVING TIRE PRESSURE SENSORS AND USING AXLE ROTATION DETECTORS

CROSS-REFERENCE TO RELATED APPLICATIONS

This application is based upon and claims the benefit of priority from prior Japanese Patent Application Nos. 2013-116987, filed on Jun. 3, 2013, and 2013-243101, filed on Nov. 25, 2013, the entire contents of which are incorporated herein by reference.

FIELD

The present invention relates to a tire position determination system that determines the position of each tire in a vehicle.

BACKGROUND

Japanese Laid-Open Patent Publication No. 2012-224230 describes a conventional example of a tire pressure monitoring system. In the system, a tire pressure detector is attached to each tire to detect the pressure of the tire. A receiver is mounted on the body of the vehicle to receive a tire pressure signal transmitted from each tire pressure detector through wireless communication. In such a system, the ID of each tire needs to be registered in advance to the receiver in association with the position of the corresponding tire so that the tire can be located when low pressure is detected.

In the tire pressure monitoring system, the tire ID needs to be registered to the receiver whenever tires are changed, for example, in accordance with the season. This is burdensome.

SUMMARY

One aspect of the present invention is a tire position determination system including a plurality of tire pressure detectors, a plurality of axle rotation detectors, a receiver, and a controller. Each tire pressure detector is attached to one of a plurality of tires and is capable of transmitting a first radio wave. The first radio wave includes a tire ID and pressure data associated with the tire ID. Each axle rotation detector corresponds to one of a plurality of axles and detects rotation of the corresponding one of the axles and outputs axle rotation information. The receiver is located on a vehicle body of a vehicle and is capable of receiving the first radio wave from each of the tire pressure detectors. The controller that monitors the pressure of each of the tires based on the first radio wave received by the receiver. Each of the tire pressure detectors is configured to detect when reaching a specific position on a rotation trajectory of the corresponding one of the tires and transmit a second radio wave including the tire ID. The controller includes an ID temporary registration unit that temporarily registers, to a memory, tire IDs received from all tire pressure detectors existing in a signal receivable area of the receiver. An ID registration unit receives the second radio wave from each of the tire pressure detectors, acquires the axle rotation information from each of the axle rotation detectors whenever receiving the second radio wave, and specifies a tire ID of a tire that rotates in synchronism with the axle rotation information of each of the axles, from the tire IDs temporarily registered in the memory, to determine a tire position of each of the tires.

A further aspect of the present invention is a tire position determination system including a plurality of tire pressure detectors, a plurality of axle rotation detectors, a receiver, and a controller. Each tire pressure detector is attached to one of a plurality of tires and is capable of transmitting a first radio wave. The first radio wave includes a tire ID and pressure data associated with the tire ID. Each axle rotation detector corresponds to one of a plurality of axles and detects rotation of the corresponding one of the axles and outputs axle rotation information. The receiver is located on a vehicle body and is capable of receiving the first radio wave from each of the tire pressure detectors. The controller monitors the pressure of each of the tires based on the first radio wave received by the receiver. Each of the tire pressure detectors is capable of transmitting position data corresponding to a position on a rotation trajectory of the corresponding one of the tires. The controller includes an ID temporary registration unit that temporarily registers, to a memory, tire IDs received from all tire pressure detectors existing in a signal receivable area of the receiver. An ID registration unit receives the position data from each of the tire pressure detectors, acquires the axle rotation information from each of the axle rotation detectors whenever receiving the position data, and specifies a tire ID of a tire that rotates in synchronism with the axle rotation information of each of the axles, from the tire IDs temporarily registered in the memory, to determine a tire position of each of the tires.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 8 is a table illustrating tire position determination results;

FIG. 9 is a schematic diagram of a second embodiment of a tire position determination system;

FIG. 10 is a schematic diagram illustrating pulse information output from an axle rotation amount sensor;

FIG. 16 is a distribution diagram of axle rotation information (pulse count value) related to a single tire ID;

FIG. 17 is a distribution diagram of the axle rotation information (pulse count value) for each tire ID; and FIG. 18 shows equations used to calculate the deviation mean and the standard deviation.

DESCRIPTION OF THE EMBODIMENTS

A first embodiment of a tire position determination system will now be described with reference to FIGS. 1 to 8.

Figure 1:
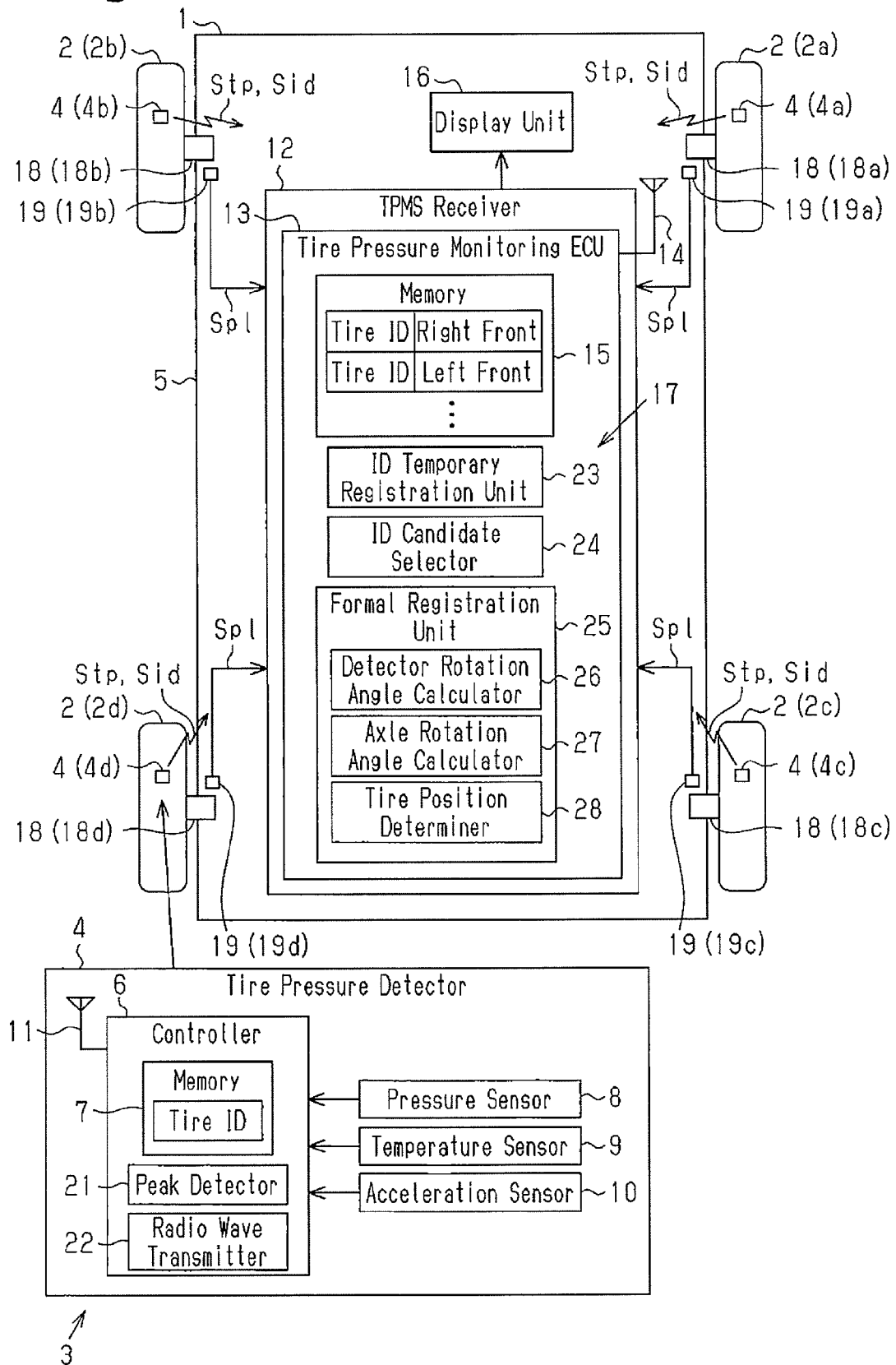
FIG. 1 is a schematic diagram of a first embodiment of a tire position determination system.

As shown in FIG. 1, a vehicle 1 includes a tire pressure monitoring system (TPMS) 3 that monitors the tire pressure of tires 2 (2a to 2d). In the tire pressure monitoring system 3, the tires 2a to 2d include tire pressure detectors 4 (4a to 4d, also referred to as tire valves), which are respectively attached to the tires 2a to 2d. Each of the tire pressure detectors 4a to 4d transmits a tire pressure signal Stp, which indicates the pressure of the corresponding tire 2, to a vehicle body 5. The tire pressure monitoring system 3 is of a direct monitoring type that monitors the tire pressure of each tire 2 based on the corresponding tire pressure signal Stp. The tire pressure signal Stp is one example of a first radio wave.

The tire pressure detectors 4 (4a to 4d) each have the same structure and include a controller 6 that controls the operation of the corresponding tire pressure detectors 4a to 4d. The controller 6 includes a memory 7 that stores a tire ID (also referred to as valve ID) as a unique ID of the corresponding one of the tires 2a to 2d. Each of the tire pressure detectors 4a to 4d includes a pressure sensor 8 that detects the pressure of the corresponding tire 2, a temperature sensor 9 that detects the temperature of the corresponding tire 2, and an acceleration sensor 10 (G sensor) that detects the acceleration (rotation) of the corresponding tire 2. In each of the tire pressure detectors 4a to 4d, the pressure sensor 8, the temperature sensor 9, and the acceleration sensor 10 are connected to the controller 6. The controller 6 is connected to a transmission antenna 11 capable of transmitting radio waves on the ultra-high frequency (UHF) band. The acceleration sensor 10 is one example of gravitational force detection unit.

The vehicle body 5 includes a receiver (hereinafter referred to as the TPMS receiver) 12 that receives the tire pressure signal Stp from each of the tire pressure detectors 4a to 4d and monitors the pressure of the tire 2. The TPMS receiver 12 includes a tire pressure monitoring electronic control unit (ECU) 13, which controls the operation of the TPMS receiver 12, and a reception antenna 14, which is capable of receiving UHF radio waves. The tire pressure monitoring ECU 13 includes a memory 15 that stores the tire ID of each of the tires 2a to 2d in association with the tire position. The TPMS receiver 12 is, for example, connected to a display unit 16 arranged in an instrument panel.

Each tire pressure detector 4 transmits the tire pressure signal Stp in predetermined time intervals to the vehicle body 5. The tire pressure detector 4 determines whether or not the corresponding tire 2 is rotating based on changes in the output of the acceleration sensor 10. Even when the corresponding tire 2 is not rotating, each tire pressure detector 4 transmits tire pressure signals Stp to the vehicle body 5 in intervals that are the same as or greater than the intervals when the corresponding tire is rotating. Regardless of whether or not the corresponding tire 2 is rotating, each tire pressure detector 4 may transmit the tire pressure signal Stp at irregular timings.

The tire pressure signal Stp includes the pressure data and tire ID of the corresponding tire 2. When the TPMS receiver 12 receives a tire pressure signal Stp from each of the tire pressure detectors 4a to 4d, the TPMS receiver 12 acquires the tire ID from the tire pressure signal Stp and verifies the tire ID. When the tire ID is verified, the TPMS receiver 12 checks the pressure data to determine whether or not the pressure is less than or equal to a low pressure threshold value. Then, the TPMS receiver 12 shows on the display unit 16 that a tire has low pressure and where that tire is located. In this manner, the TPMS receiver 12 determines the tire pressure whenever the tire pressure signal Stp is received to monitor the pressure of each of the tires 2a to 2d.

As shown in FIG. 1, the tire pressure monitoring system 3 includes a tire position determination system 17 that automatically determines the position, namely, right front, right rear, left front, or left rear position of each of the tires 2a to 2d, which respectively include the tire pressure detectors 4a to 4d. The tires 2a to 2d are respectively coupled to axles 18 (18a to 18d). Each tire pressure detector 4 transmits a position determination radio wave including a tire ID when the tire pressure detector 4 reaches a predetermined peak position (e.g., twelve o'clock position) in the rotation trajectory of the corresponding tire 2. For example, each pressure detector 4 detects the peak position twice based on two temporally separated determination timings. In the present embodiment, during a first determination period from a first determination timing t1 to when each tire completes a single rotation, each tire pressure detector 4 detects the peak position and transmits a radio wave at a first peak detection timing, which is when the peak position is detected. Then, during a second determination period from a second determination timing t2, which is subsequent to the first determination period, to when each tire completes a single rotation, each tire pressure detector 4 again detects the peak position and transmits a radio wave at a second peak detection timing, which is when the peak position is detected. Based on the two radio waves, the TPMS receiver 12 obtains the detector rotation angle θa indicating the relative rotation angle of each tire pressure detector 4 that changed from the first determination period to the second determination period. Further, the TPMS receiver 12 obtains the axle rotation angle θb of each axle 18 that changed during the two determination periods. Then, the TPMS receiver 12 compares the detector rotation angle θa and the axle rotation angle θb to determine the tire position. The peak position is one example of a specific position (pole).

The tire pressure monitoring ECU 13 is connected to axle rotation amount sensors 19 (19a to 19d) that respectively detect the rotation amount of the axles 18 (18a to 18d). An antilock brake system (ABS) sensor may be used for each axle rotation amount sensor 19a to 19d. For example, each axle rotation amount sensor 19 detects a plurality of (e.g., forty-eight) teeth arranged on the corresponding axle 18. Then, the axle rotation amount sensor 19 sends a rectangular pulse signal Spl, which indicates the axle rotation amount Cx, to the tire pressure monitoring ECU 13. When the tire pressure monitoring ECU 13 detects both rising and falling edges in the pulse signal Spl, the tire pressure monitoring ECU 13 detects 96 pulse edges (count value: 0 to 95) for each rotation of the corresponding tire 2. The axle rotation amount sensor 19 is one example of an axle rotation detector. The pulse signal Spl (axle rotation amount Cx) is one example of axle rotation information.

Figure 2:
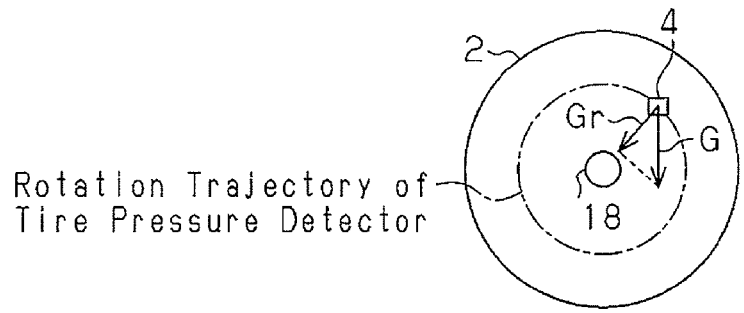
FIG. 2 is a schematic diagram illustrating a centripetal component detected by a tire pressure detector.

As shown in FIG. 2, the acceleration sensor 10 detects the centripetal component Gr of the gravitational force acting in the radial direction of the tire 2 toward the axle 18 (center of tire 2) from the tire pressure detector 4. In the rotation trajectory of the tire 2, when the tire pressure detector 4 reaches the top peak position (twelve o'clock position) and the bottom peak position (six o'clock position), the centripetal component Gr is respectively "+1 G" and "−1 G" as long as centrifugal force is ignored. In the rotation trajectory of the tire 2, when the tire pressure detector 4 reaches the three o'clock position and the nine o'clock position, the centripetal component Gr is respectively "0 G" as long as centrifugal force is ignored. The centripetal component Gr of the gravitational force Gr is one example of position data.

Figure 3A:
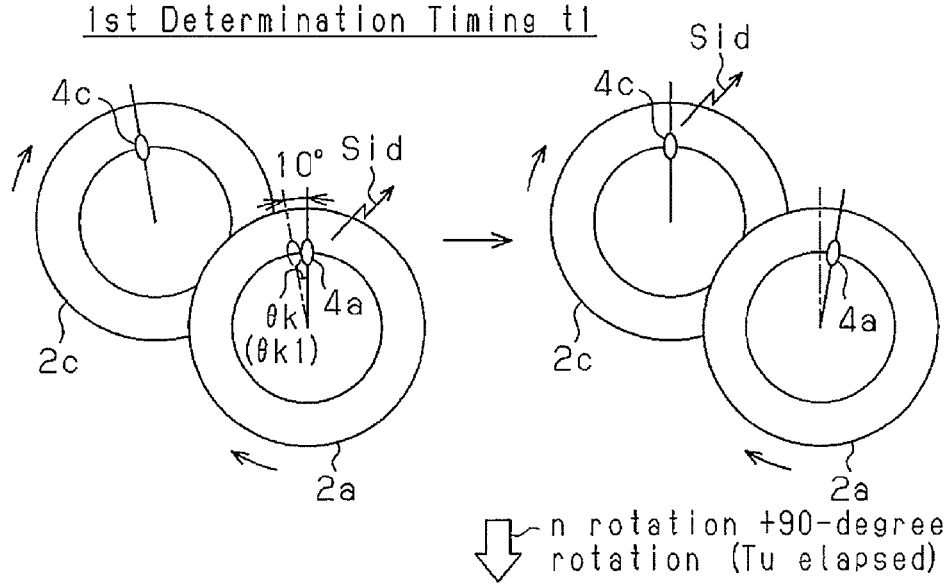
FIGS. 3A and 3B are diagrams illustrating the calculation of a detector rotation angle.

The principle for determining the tire position will now be described with reference to FIGS. 3A and 3B. Here, the right front tire 2a and the right rear tire 2c will be used as an example. Referring to FIG. 3A, at the first determination timing t1, the angular difference of the right front tire pressure detector 4a and the right rear tire pressure detector 4c is 10 degrees. The right front tire pressure detector 4a is located at the top peak position, and the right rear tire pressure detector 4c is located at the −10 degree position from the right front tire pressure detector 4a. In the first determination period that starts at the first determination timing t1, each of the detectors 4a and 4c detects the top peak position. In this example, the right front tire pressure detector 4a first transmits the peak ID radio wave Sid at the peak detection timing. Then, when the tires 2a and 2c are rotated by 10 degrees, the right rear tire pressure detector 4c transmits the peak ID radio wave Sid at the peak detection timing. The peak ID radio wave Sid includes the tire ID. Further, the peak ID radio wave Sid is one example of a second radio wave.

When the peak ID radio wave Sid is received from each of the right front and right rear tire pressure detectors 4a and 4c during the first determination period, the TPMS receiver 12 acquires the axle rotation amount Cx of a representative wheel 20 that is selected from the four tires 2a to 2d from the corresponding axle rotation amount sensor 19. Then, the TPMS receiver 12 obtains a first detector angle θk (first relative rotation angle θk1) between the right front tire pressure detector 4a and the right rear tire pressure detector 4c based on the difference of the axle rotation amount Cx that is acquired when the peak ID radio wave Sid is received from the detector 4a and the axle rotation amount Cx that is acquired when the peak ID radio wave Sid is received from the detector 4c. The angle 9k is the angle between a line extending through the tire center in the vertical direction and a line connecting the tire pressure detector 4 and the tire center. In FIG. 3A, when setting the location of the right front tire pressure detector 4a as the reference position, the first detector angle θk1 is calculated as −10 degrees. Preferably, a rear wheel is used as the representative wheel 20 since the influence of the difference between the tracks followed by the inner front and rear wheels when turning and the difference between the tracks followed by the outer front and rear wheels when turning are small during a single determination period that starts at each of the determination timings.

Figure 3B:
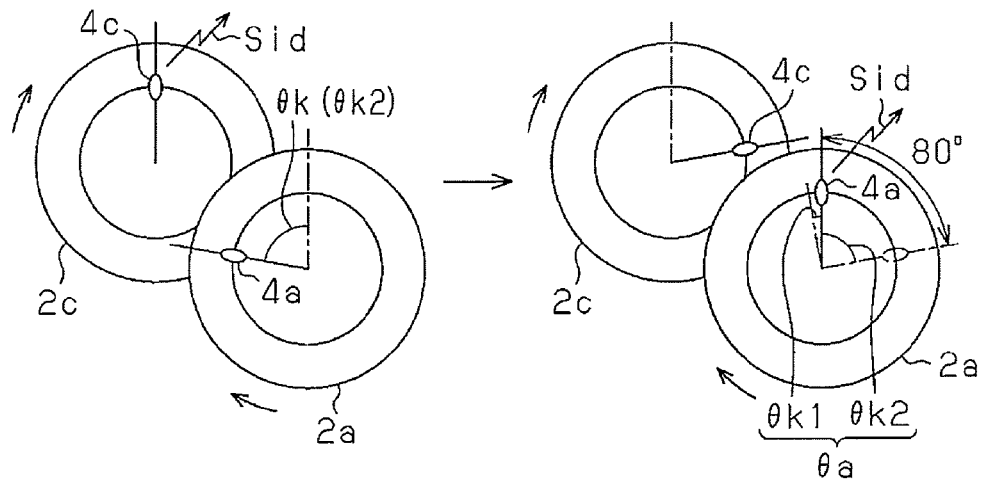

FIG. 3B shows the rotation of the right front tire 2a and the right rear tire 2c at the second determination timing when time Tu elapses after the first determination timing t1. For example, when the vehicle 1 turns and a difference is produced between the tracks followed by the right front tire 2a and the right rear tire 2c that are located at the outer side or the inner side, the rotation phase of the right tire pressure detector 4c is advanced by 90 degrees from the rotation phase of the right front tire pressure detector 4a at the first determination timing t1. In this example, at the second determination timing t2, the right rear tire pressure detector 4c is located at the top peak position. Accordingly, in the second determination period that starts at the second determination timing t2, the right rear tire pressure detector 4c first transmits the peak ID radio wave Sid at the peak detection timing. Subsequently, when the tires 2a and 2c are rotated by 80 degrees, the right front tire pressure detector 4a transmits the peak ID radio wave Sid at the peak detection timing. In the present embodiment, regardless of the rotation speed of the tire 2, each tire pressure detector 4 transmits the peak ID radio wave Sid at the peak detection timing after each determination timing which is reached in predetermined cycles (e.g., time Tu=60 seconds). The time interval of the determination timing is not limited to a fixed interval and may be a non-cyclic interval.

When the peak ID radio wave Sid is received from each of the right rear and right front tire pressure detectors 4c and 4a during the second determination period, the TPMS receiver 12 obtains the axle rotation amount Cx of the representative wheel 20 from the corresponding axle rotation amount sensor 19. Then, in the same manner as the first determination period, the TPMS receiver 12 obtains the second detector angle θk (second relative rotation angle θk2) between the tire pressure detectors 4a and 4c. In FIG. 3B, when setting the location of the right front tire pressure detector 4a as the reference position, the second detector angle θk2 is calculated as +80 degrees. Accordingly, by obtaining the difference (θk2−θk1) of the angle θk1 (−10 degrees), which is acquired based on the first determination timing t1, and the angle θk2 (+80 degrees), which is acquired based on the second determination timing t2, the detector rotation angle θa of the right rear tire pressure detector 4c is calculated as 90 degrees between the first and second peak detection timings of the right front tire pressure detector 4a.

Figure 4:
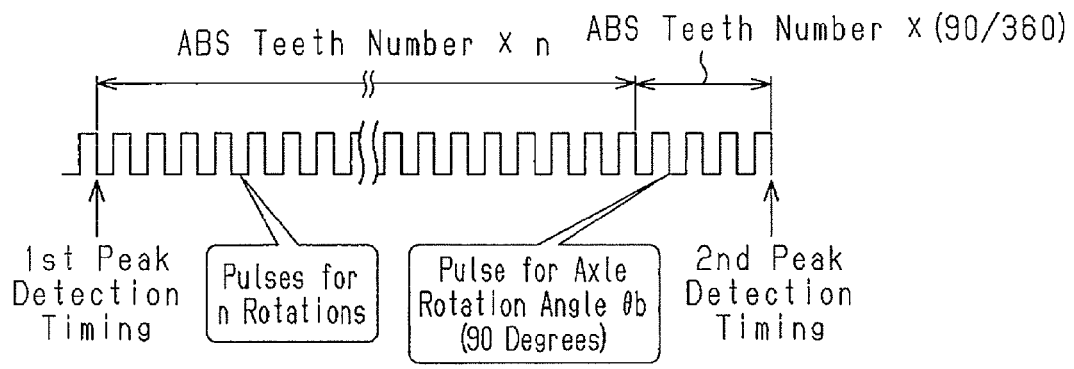
FIG. 4 is a pulse waveform chart illustrating the axle rotation angle.

Referring to FIG. 4, the TPMS receiver 12 obtains the difference of the axle rotation amount Cx of the right rear tire 2c that is acquired at the first peak detection timing (FIG. 3A) of the right front tire pressure detector 4a and the axle rotation amount Cx of the right rear tire 2c that is acquired at the second peak detection timing (FIG. 3B) of the right front tire pressure detector 4a to acquire the axle rotation angle θb of the right rear tire 2c (axle 18c) that changes between the first and second peak detection timings of the right front tire pressure detector 4a used as the reference position. In the same manner, the TPMS receiver 12 may also obtain the axle rotation angle θb of each of the tires 2a, 2b, and 2d (axles 18a, 18b, and 18d). Thus, the TPMS receiver 12 may specify the tire 2 to which the tire pressure detector 4c is attached as the right rear tire 2c by comparing the detector angle θa of the right rear tire pressure detector 4c with the axle rotation angle θb of each tire 2. In the present embodiment, the four tire positions are determined using such an automatic location determination principle.

As shown in FIG. 1, the controller 6 includes a peak detector 21, which detects the peak position of the tire pressure detector 4 based on the detection signal of the acceleration sensor, and a radio wave transmitter 22, which controls the transmission of the peak ID radio wave Sid. In the present embodiment, at each of the determination timings t1 and t2, the peak detector 21 detects the centripetal component Gr of the gravitational force G with high frequency during a short cycle of time to detect the peak of the centripetal component Gr. When the peak detector 21 detects the peak of the centripetal component Gr during each determination period, the radio wave transmitter 22 transmits a peak ID radio wave Sid from the transmission antenna 11.

The tire pressure monitoring ECU 13 includes an ID temporary registration unit 23 that temporarily registers every one of the tire IDs received by the TPMS receiver 12 prior to the automatic location determination described above. That is, the TPMS receiver 12 temporarily registers the tire IDs received from all tire pressure detectors 4 existing in the area where signals are receivable by the TPMS receiver 12. For example, when the engine of the vehicle 1 is stopped, the ID temporary registration unit 23 deletes the tire position information from the memory 15. Preferably, the ID temporary registration unit 23 executes such a temporary registration process only during a certain fixed time. The time during which the ID temporary registration unit 23 executes temporary registration may be a period in which the TPMS receiver 12 is not executing an automatic location determination. In any case, the ID temporary registration unit 23 temporary registers every one of the tire IDs collected during the temporary registration period to the memory 15.

The tire pressure monitoring ECU 13 includes an ID candidate selector 24 that selects from the temporarily registered tire IDs an automatic location candidate, that is, the tire ID of which tire position should be determined. For example, after the vehicle 1 starts traveling, the ID candidate selector 24 selects, from the temporarily registered tire IDs, the tire ID received by the TPMS receiver 12 when the vehicle 1 is traveling as the automatic location candidate.

The tire pressure monitoring ECU 13 includes a formal registration unit 25 that executes formal registration of a tire ID based on the automatic location candidate. The formal registration unit 25 includes a detector rotation angle calculator 26, an axle rotation angle calculator 27, and a tire position determiner 28. The detector rotation angle calculator 26 calculates the detector rotation angle θa of each tire pressure detector 4 based on the difference of the detector angles θk1 and θk2 obtained during the first and second determination periods (refer to FIGS. 3A and 3B). The axle rotation angle calculator 27 calculates the axle rotation angle θb of each of the axles 18a to 18d based on the axle rotation amount Cx (pulse number) of each of the axle rotation amount sensors 19a to 19d (refer to FIG. 4). The tire position determiner 28 compares the detector rotation angle θa and the axle rotation angle θb to determine a tire position. In the preferred embodiment, the formal registration unit 25 forms an ID registration unit. Further, the peak detector 21 forms a specific position detector, and the radio wave transmitter 22 forms a specific position notification unit.

The operation of the tire position determination system 17 will now be described with reference to FIGS. 5 to 8.

Tire ID Temporary Registration

Figure 5:
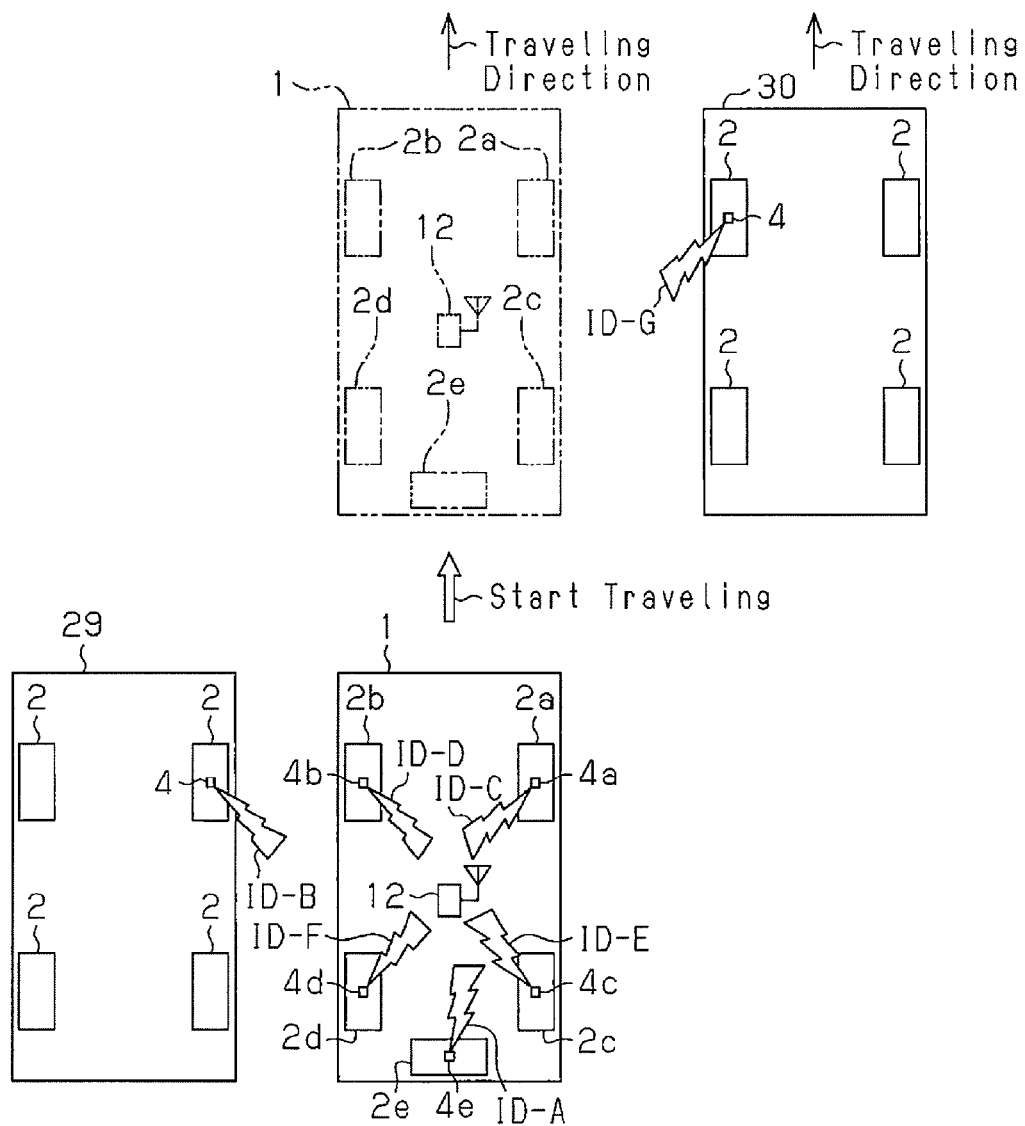
FIG. 5 is a schematic diagram illustrating temporary registration of tire IDs.

Referring to FIG. 5, during a temporary registration period, the ID temporary registration unit 23 temporarily registers every one of the tire IDs (peak ID radio wave Sid) received by the TPMS receiver 12. The radio wave received in the temporary registration includes the tire pressure signal Stp in addition to the peak ID radio wave Sid. For example, the TPMS receiver 12 may receive ID-A of a spare tire 2e (tire pressure detector 4e) of the vehicle 1, ID-B of a tire of a vehicle 29 parked next to the vehicle 1, ID-C of the right front tire 2a of the vehicle 1, ID-D of the left front tire 2b of the vehicle 1, ID-F of the left rear tire 2d, and IF-G of a tire 2 of a vehicle 30 traveling next to the vehicle 1.

Each tire rotates when the vehicle 1 is traveling. Thus, the corresponding tire pressure detector 4 cyclically transmits the peak ID radio wave Sid due to the tire rotation. In contrast, the tire of the parked vehicle 29 and the spare tire 2e do not rotate. Thus, the tire pressure detectors 4 of these tires do not transmit radio waves. When the vehicle 1 travels, the TPMS receiver 12 does not receive the peak ID radio wave Sid from the tire pressure detectors 4 of the tire of the parked vehicle 29 and the spare tire 2e. Accordingly, when the vehicle 1 is traveling, among the temporarily tire IDs, the ID candidate selector 24 selects the tire ID of which the peak ID radio wave Sid is received as the automatic location candidate. In this case, ID-C, ID-D, ID-E, ID-F, and ID-G are selected as the automatic location candidate. The tire IDs that are not selected as automatic location candidates remain undeleted in the memory 15.

Tire ID Formal Registration

Figure 6:
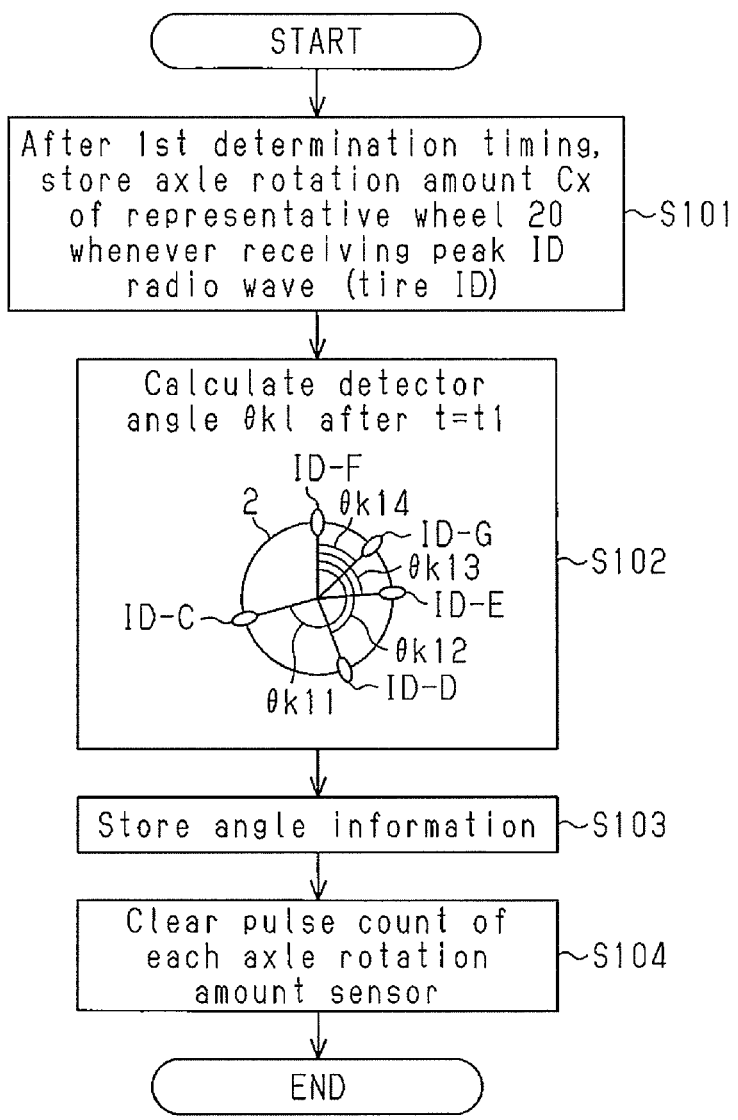
FIG. 6 is a flowchart of a tire position determination process executed during a first determination period.

Referring to FIG. 6, in step S101, during the first determination period from the first determination timing t1, the detector rotation angle calculator 26 receives the peak ID radio wave Sid transmitted at a first peak detection timing from each of the tire pressure detectors 4a to 4d. Whenever the peak ID radio wave Sid is received, the detector rotation angle calculator 26 sequentially stores the axle rotation amount Cx of the representative wheel 20 from the corresponding axle rotation amount sensor 19. In this case, as long as the communication environment is favorable, the detector rotation angle calculator 26 receives the peak ID radio wave Sid and obtains the axle rotation amount Cx from each of the tire pressure detectors 4a to 4d before each tire 2 completes a single rotation.

In step S102, the detector rotation angle calculator 26 calculates the first detector angle θk1 between the tire (tire pressure detector) used to set the reference position and another tire (tire pressure detector) based on each axle rotation amount Cx stored in the memory 15 in step S101. For example, when the peak ID radio wave Sid received finally includes the tire ID of ID-F, and the left rear tire 2d having the ID-F is used to set the reference position, the first detector angle θk1 of the right front tire 2a (ID-C) is calculated as θk11. Further, the first detector angle θk1 of the left front tire 2b (ID-D) is calculated as θk12. The first detector angle θk1 of the right rear tire 2c (ID-E) is calculated as θk13. The first detector angle θk1 of the tire 2 (ID-G) of the vehicle 30 traveling next to the vehicle 1 is calculated as θk14. In this case, the reference position is set on the left rear tire 2d. Thus, the first detector angle θk1 of the left rear tire 2d (ID-F) cannot be obtained.

In step S103, the detector rotation angle calculator 26 stores in the memory 15 the angle information obtained during the first determination period, that is, the first detector angle θk11 of the right front tire 2a (ID-C), the first detector angle θk12 of the left front tire 2b (ID-D), the first detector angle θk13 of the right rear tire 2c (ID-E), and the first detector angle θk14 of the 2 (ID-G) of the vehicle 30 traveling next to the vehicle 1.

In step S104, the axle rotation angle calculator 27 clears the pulse count output of each of the axle rotation amount sensors 19a to 19d. Then, the axle rotation angle calculator 27 starts detection (pulse counting) of the axle rotation amount Cx of each of the axles 18a to 18d.

Figure 7:
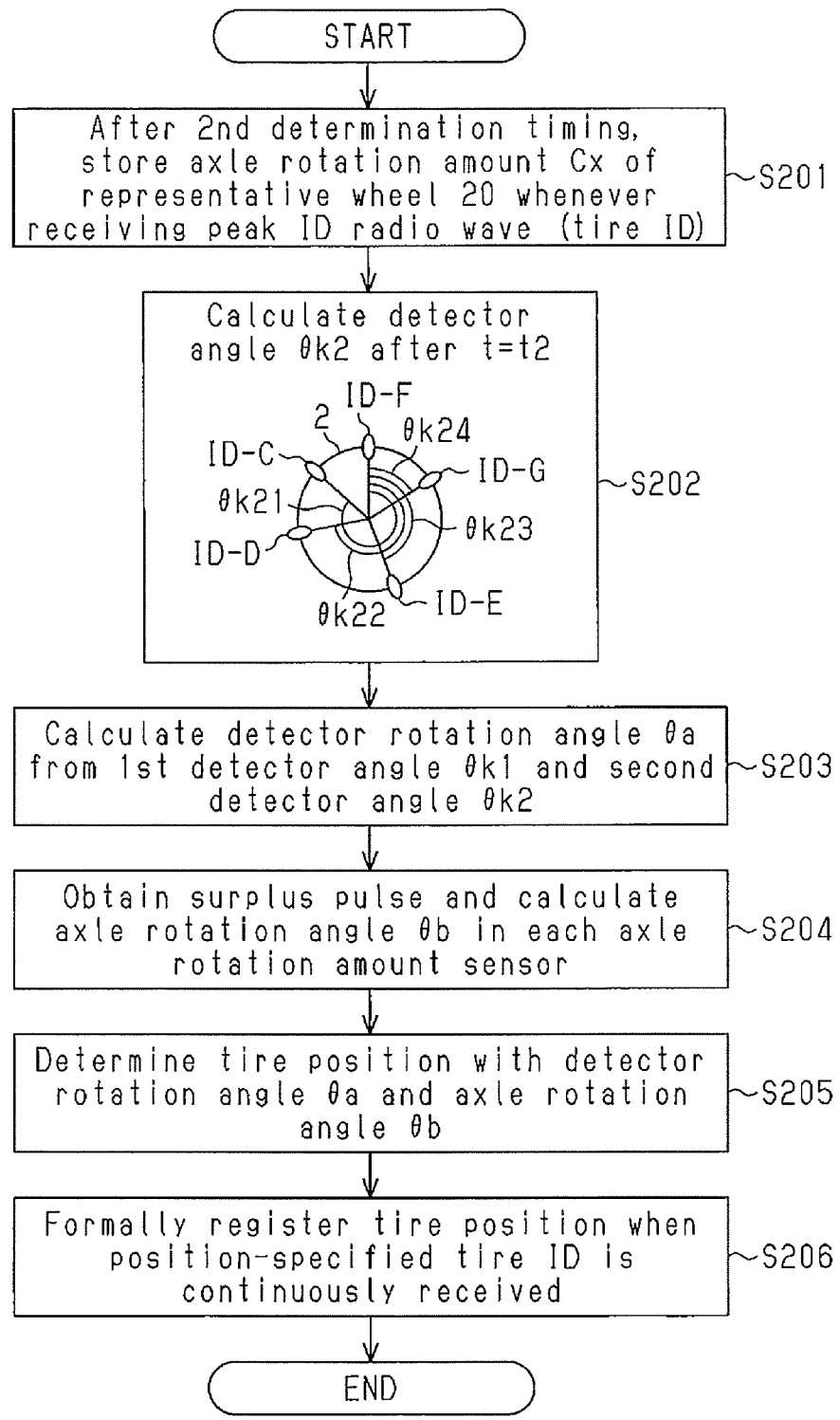
FIG. 7 is a flowchart of a tire position determination process executed during a second determination period.

Referring to FIG. 7, in step S201, during the second determination period from the second determination timing t2, the detector rotation angle calculator 26 receives the peak ID radio wave Sid transmitted at a second peak detection timing from each of the tire pressure detectors 4a to 4d. Whenever the peak ID radio wave Sid is received, the detector rotation angle calculator 26 sequentially stores the axle rotation amount Cx of the representative wheel 20 from the corresponding axle rotation amount sensor 19. The second determination timing t2 is set at a timing at which time Tu elapses after the first determination timing t1. The time Tu is the period of time during which a difference may be expected to be produced between the tracks followed by the inner or outer front and rear wheels when turning. Also in this case, as long as the communication environment is favorable, the detector rotation angle calculator 26 receives the peak ID radio wave Sid and obtains the axle rotation amount Cx from each of the tire pressure detectors 4a to 4d before each tire 2 completes a single rotation.

In step S202, the detector rotation angle calculator 26 calculates the second detector angle θk2 between the tire (tire pressure detector) used to set the reference position and another tire (tire pressure detector) based on each axle rotation amount Cx stored in the memory 15 in step S201. For example, when the peak ID radio wave Sid received finally includes the tire ID of ID-F, and the left rear tire 2d having the ID-F is used to set the reference position, the second detector angle θk2 of the right front tire 2a (ID-C) is calculated as θk21. Further, the second detector angle θk2 of the left front tire 2b (ID-D) is calculated as θk22. The second detector angle θk2 of the right rear tire 2c (ID-E) is calculated as θk23. The second detector angle θk2 of the tire 2 (ID-G) of the vehicle 30 traveling next to the vehicle 1 is calculated as θk24.

In step S203, the detector rotation angle calculator 26 calculates the detector angle ea of each tire 2 (tire pressure detector 4) based on the difference of the first detector angle θk1, which is acquired in the first determination period, and the second detector angle θk2, which is acquired in the second determination period. In this case, the detector rotation angle ea is calculated for the tires of ID-C, ID-D, ID-E, and ID-G. The detector rotation angle ea of the right front tire 2a (ID-C) is obtained from the difference of the angle θk11 and the angle θk21. The detector rotation angle ea of the left front tire 2b (ID-D) is obtained from the difference of the angle θk12 and the angle θk22. The detector rotation angle ea of the right rear tire 2c (ID-E) is obtained from the difference of the angle θk13 and the angle θk23. The detector rotation angle θa of the tire 2 (ID-G) of the vehicle 30 traveling next to the vehicle 1 is obtained from the difference of the angle θk14 and the angle θk24.

In step S204, the axle rotation angle calculator 27 subtracts pulses for an n number of rotations from the pulse count output of each of the axle rotation amount sensors 19a to 19d to obtain the surplus pulses and calculate the axle rotation angle θb of each of the axles 18a to 18d.

In step S205, the tire position determiner 28 compares the detector rotation angle θa of each tire 2 (tire pressure detector 4) calculated in step S203 with the axle rotation angle θb of each axle 18 calculated in step S204 to determine the position of each tire 2. As for the tires 2 of ID-C, ID-D, and ID-E, the axle rotation angle θb conforms to the detector rotation angle θa. Accordingly, the tire position determiner 28 determines that the tires 2 of ID-C, ID-D, and ID-E are the right front tire 2a, the left front tire 2b, and the right rear tire 2c, respectively. In this manner, the tire position determiner 28 specifies the tire position by associating each of ID-C, ID-D, and ID-E with the axle rotation information (axle rotation angle θb). As for the tire 2 of ID-G, the axle rotation angle θb does not conform to the detector rotation angle θa. Thus, the position of the tire 2 of ID-G cannot be specified.

When every one of the tire positions cannot be specified, the formal registration unit 25 waits for the third determination timing t3 when time Tu elapses after the second determination timing t2. Then, during a third determination period which is from the third determination timing t3 to when each tire 2 completes a single rotation, the formal registration unit 25 executes a process similar to those executed in the first and second determination periods. Subsequently, the formal registration unit 25 determines tire positions in the same manner as described above based on the results obtained through the processes executed in the second and third determination periods. In this manner, the tires 2 of ID-C, ID-D, ID-E, and ID-F are assumed to belong to the vehicle 1, and the tire of ID-G is assumed to belong to another vehicle.

In step S206, the tire position determiner 28 repetitively undergoes each of the determination periods described above for a predetermined number of times and determines whether or not ID-C, ID-D, ID-E, and ID-F that are assumed to belong to the tires 2 of the vehicle 1 are continuously received. That is, the tire position determiner 28 checks whether or not the automatic location determination results are continuously the same, more specifically, whether or not the positions of the tires 2 of ID-C, ID-D, ID-E, and ID-F are continuously determined as being the same positions. When determining that the automatic location determination results are continuously the same, the tire position determiner 28 formally registers the positions of the tires of ID-C, ID-D, ID-E, and ID-F to the memory 15.

FIG. 8 shows tire position determination logic results. ID-A, which was not selected as an automatic location candidate in the initial state, is the tire ID of the spare tire 2e. Thus, the TPMS receiver 12 receives ID-A in fixed intervals. ID-B, which is received from the parked vehicle 29, will not be received sooner or later. Thus, even when a tire ID is not selected as an automatic location candidate (ID-A), as long as the tire ID (ID-A) is received in fixed cycles, the tire ID (ID-A) is specified as the ID of the spare tire 2e and formally registered to the memory 15. In this case, when the pressure of the tire (ID-A) is greater than or equal to a lower pressure threshold, the tire position determiner 28 may determine that the tire ID (ID-A) is the ID of the spare tire 2e. This completes the position determination of the right front, left front, right rear, and left rear tires 2a to 2d and the spare tire 2e.

The first embodiment has the advantages described below.

(1) The ID temporary registration unit 23 temporarily registers every one of the tire IDs received by the TPMS receiver 12 during a certain time. The formal registration unit 25 selects the tire IDs of which tire positions are to be determined from the temporarily registered tire IDs. Then, the formal registration unit 25 obtains the detector rotation angle θa of each tire pressure detector 4 and the axle rotation angle θb of each axle 18 that change between the first determination period after timing t1 and the second determination period after timing t2. The formal registration unit 25 compares the detector rotation angles θa with the axle rotation angles θb to determine the tire position. In this structure, the TPMS receiver 12 automatically registers the tire IDs. Thus, there is no need for the user to register the tire IDs. This eliminates the burden for re-registering the tire IDs to the TPMS receiver 12, for example, whenever changing the tires 2 in accordance with the season.

(2) The TPMS receiver 12 temporarily registers every one of the tire IDs received during the temporary registration period and selects tire IDs of which tire positions are to be determined from the temporarily registered tire IDs. This improves the tire position determination accuracy.

(3) Among the temporarily registered tire IDs, the TPMS receiver 12 selects tire IDs that are periodically received when the vehicle 1 is traveling to determine the tire positions. This further improves the tire position determination accuracy.

(4) The temporary registration time is limited to a certain period to reduce the possibility of unnecessary tire IDs being temporarily registered. This allows for a decrease in the memory capacity used to temporarily register the tire IDs. Thus, the processing load may be decreased. As a result, there is no need for a high-performance CPU. Further, a decrease in the temporarily registered IDs shortens the time used to complete the formal registration.

(5) When the temporary registration time is set at all times excluding the formal registration time, the temporary registration time may be lengthened. This limits non-temporarily registered tire IDs.

(6) When the TPMS receiver 12 receives a tire ID that was not selected as an automatic location candidate in fixed intervals when the vehicle 1 is traveling, the TPMS receiver 12 determines that the tire ID belongs to the spare tire 2e. In this case, when the tire pressure is greater than or equal to the low pressure threshold, the TPMS receiver 12 may specify the tire ID as that of the spare tire 2e. In this manner, the TPMS receiver 12 is able to register the tire position of the spare tire 2e.

(7) After determining the tire position through automatic location determination, the TPMS receiver 12 checks whether or not the determination result is continuously the same. When the determination result is continuously the same, the tire positions are formally registered to the TPMS receiver 12. This further improves the tire position determination accuracy.

(8) Each tire pressure detector 4 transmits a peak ID radio wave Sid when reaching the peak position in the rotation trajectory of the corresponding tire 2. Then, the TPMS receiver 12 calculates the detector angle θk of each tire pressure detector 4 whenever receiving the peak ID radio wave. The detector angle θk is calculated in the first determination period (first determination timing t1) and the second determination period (second determination timing t2). The TPMS receiver 12 calculates the detector rotation angle θa of each tire pressure detector 4 changed between the first determination period and the second determination period. The TPMS receiver 12 compares each detector rotation angle θa with the axle rotation angle θb of each axle 18 to determine the tire positions. This allows for the determination of tire positions even when the vehicle 1 is traveling. Thus, the degree of freedom for when to perform the tire position determination is increased. This is advantageous for completing the tire position determination at an early stage after the vehicle 1 starts to travel.

A second embodiment will now be described with reference to FIGS. 9 and 10. The second embodiment differs from the first embodiment in how to count the pulses of the representative wheel 20. Like or same reference numerals are given to those components that are the same as the corresponding components of the first embodiment. Such components will not be described in detail, and the description will focus on differences from the first embodiment.

Referring to FIG. 9, the axle rotation amount sensor 19 does not have to output a signal whenever detecting a single pulse and may output the total number of pulses measured during a certain time as pulse information Dpl. In this case, the pulse information Dpl is repetitively output in fixed intervals. For example, when 12 pulses are detected during a period from when the pulse information Dpl is output to when the following pulse information Dpl is output, the pulse information Dpl of 12 pulses is output to the tire pressure monitoring ECU 13 through a controller area network (CAN) or the like.

In such a configuration, during a period from when the pulse information Dpl is received to when the following pulse information Dpl is received, the TPMS receiver 12 may receive the peak ID radio wave Sid (tire ID) from the tire pressure detector 4. That is, when the axle rotation amount sensor 19 cyclically outputs the pulse information Dpl in predetermined pulse output intervals Ts, the TPMS receiver 12 receives the tire ID when obtaining the pulse information Dpl. In this case, the TPMS receiver 12 cannot obtain the correct pulse number when receiving the tire ID. For example, when the pulse information Dpl indicates 50 pulses, the following pulse information Dpl indicates 72 pulses, and the tire ID is received when, for example, the pulse number is 55, the pulse number cannot be correctly obtained when the tire ID is received.

To accurately obtain the pulse number, the tire pressure monitoring ECU 13 includes a pulse number calculator 35. The pulse number calculator 35 detects the timing when a tire ID is received during a period between the pulse output intervals Ts. Then, the pulse number calculator 35 obtains the ratio of the pulse number at the receiving timing relative to the total number of pulses in the pulse output interval. Based on this ratio, the pulse number calculator 35 calculates the true pulse number when receiving the tire ID.

For example, the preceding pulse information Dpl may include 12 pulses, the pulse output interval Ts may be 30 ms, and the total number of pulses during the pulse output intervals Ts may be 12 pulses. In this case, if ID-C (tire ID) is received after 10 ms elapses from when the pulse information Dpl is received, 12 pulses×10 ms/30 ms=4 pulses is calculated. In this case, 4 is added to the pulse number of 12, which is obtained from the preceding pulse information Dpl, to calculate the pulse number of 16 at the timing ID-C is received. The same calculation is performed from the other tire IDs (ID-D, ID-E, and ID-F).

Referring to FIG. 10, when the axle rotation amount sensor 19 outputs the pulse information Dpl in fixed intervals, the mean value of the pulse information Dpl output from the axle rotation amount sensors 19a to 19d may be used as the pulse amount indicating the rotation amount of the representative wheel 20. In an example, the output of the right front sensor 19a is 12 pulses, the output of the left front sensor 19b is 12 pulses, the output of the right rear sensor 19c is 11 pulses, and the output of the left rear sensor 19d is 12 pulses. In this case, the mean value of the pulse information Dpl is 11.75 pulses. Accordingly, even when the rotation speeds of the four tires 2a to 2d slightly differ, the representative wheel 20 is assumed as rotating at a speed corresponding to the mean value of 11.75 pulses. When necessary, the mean value may be rounded. In this example, for instance, the mean pulse number is rounded to 12 pulses.

A specific example will now be described. A tire ID is received during a period in which the tire 2 (representative wheel 20) completes a single rotation, that is, during the period in which the count value varies from 0 to 95. For example, if the rotation amount of the representative wheel 20 is 79 pulses when the preceding pulse information Dpi is received, the rotation amount of the representative wheel 20 when the following pulse information Dpl is obtained is recognized as 79+12=91 pulses. In this case, the true rotation amount of the representative wheel 20 when the tire ID is received during the time of the pulse output interval Ts is calculated as follows.

For example, the pulse output interval Ts may be 30 ms, the mean pulse number during the pulse output interval Ts may be 12 pulses, and ID-C may be received after 10 ms elapses from when the preceding pulse information Dpl is received. In this case, the true rotation amount of the representative wheel 20 is calculated as 79 pulses+12 pulses×10 ms/30 ms=83 pulses is calculated.

In addition to advantages (1) to (8) of the first embodiment, the second embodiment has the advantages described below.

(9) Even when the axle rotation amount sensor 19 periodically outputs the total number of pulses measured during a certain time as the pulse information Dpl, the tire positions may be accurately determined.

(10) The pulse number of the representative wheel 20 may be accurately calculated. This is advantageous for improving the determination accuracy of the tire positions.

A third embodiment will now be described with reference to FIGS. 11 and 12. Differences from the first and second embodiment will be described in detail.

Figure 11:
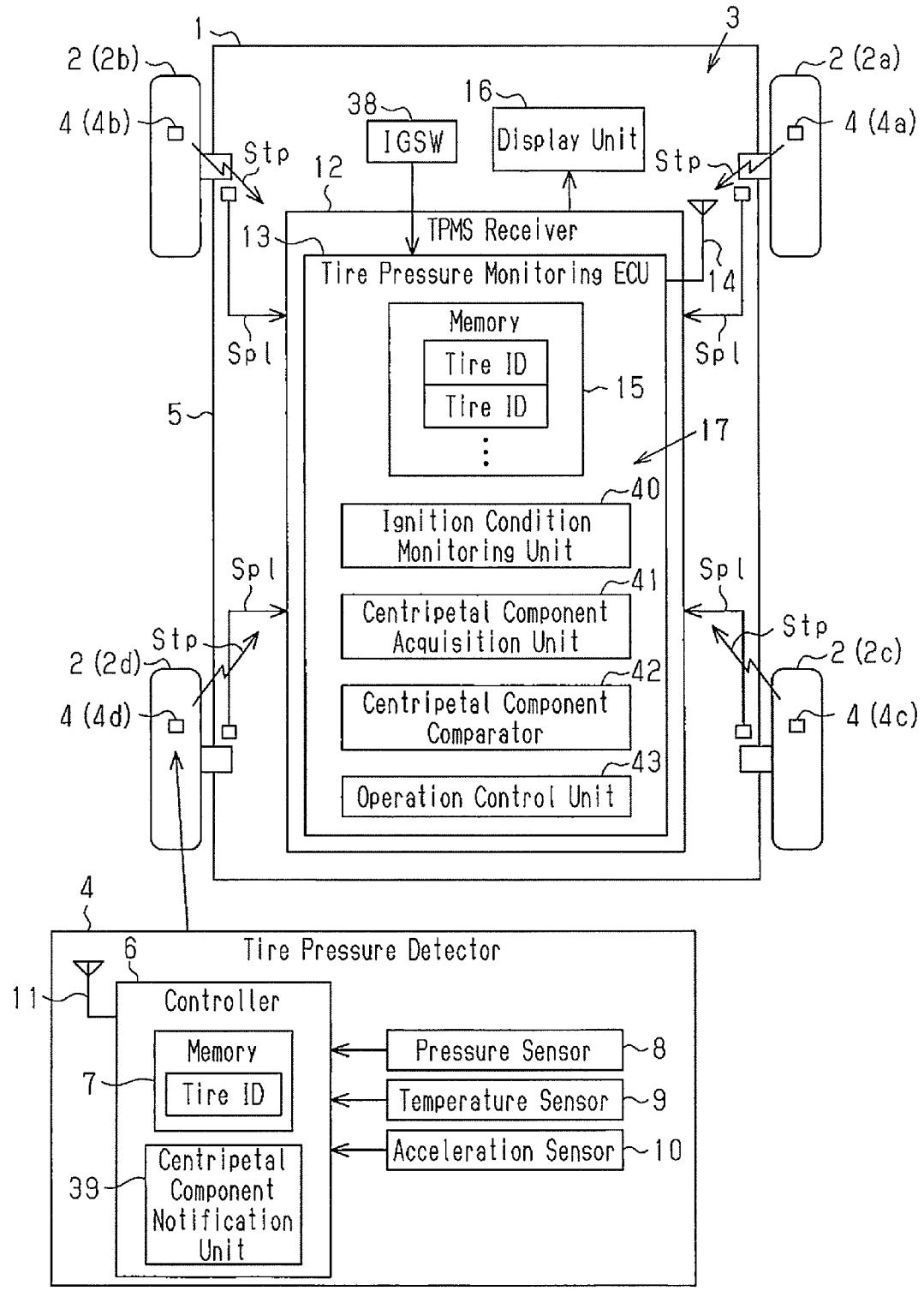
FIG. 11 is a schematic diagram of a third embodiment of a tire position determination system.
Figure 12:
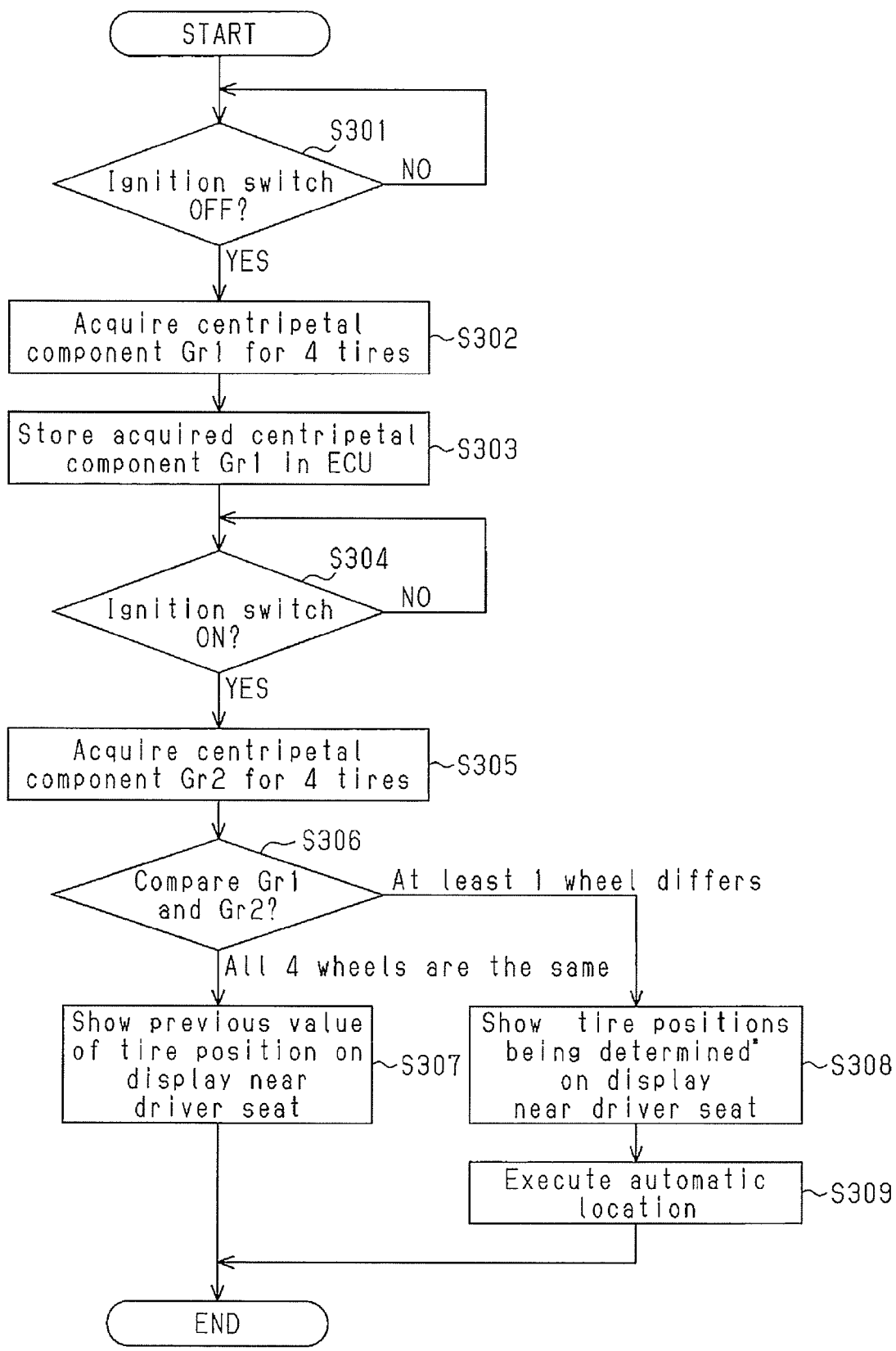
FIG. 12 is a flowchart illustrating the operation of a tire position change detection function.

Referring to FIG. 11, the tire pressure monitoring ECU 13 includes a tire position change detection function (tire rotation detection function) that determines whether or not the tire positions have been changed during deactivation of the ignition switch 38 based on the centripetal component Gr of the gravitational force G detected by the acceleration sensor 10. For example, the tire positions may be changed when the ignition switch 38 is deactivated and the engine is stopped. In such a case, the tire pressure monitoring ECU 13 detects the positions of the tires 2a to 2d when the ignition switch 38 is activated again.

In the third embodiment, the controller 6 includes centripetal component notification unit 39. The centripetal component notification unit 39 transmits a tire pressure signal Stp including the centripetal component data (centripetal component Gr) to the TPMS receiver 12 in regular intervals or irregular intervals. The centripetal component notification unit 39 determines whether or not the tire 2 has stopped rotating based on a change amount of the centripetal component Gr of the gravitational force G. Further, the centripetal component notification unit 39 may transmit the tire pressure signal Stp when the tire 2 is just about to stop rotating or when the tire 2 stops rotating. The tire pressure monitoring ECU 13 includes an ignition condition monitoring unit 40 and a centripetal component acquisition unit 41. The ignition condition monitoring unit 40 monitors the condition of the ignition switch 38 based on a signal output from the ignition switch 38. The centripetal component acquisition unit 41 acquires the centripetal component data (centripetal component Gr) from the tire pressure signal Stp. For example, the centripetal component acquisition unit 41 acquires the centripetal component Gr of the tires 2a to 2d when the ignition switch 38 is deactivated and the centripetal component Gr of the tires 2a to 2d when the ignition switch 38 is activated. In the third embodiment, the ignition condition monitoring unit 40 and the centripetal component acquisition unit 41 form a characteristic acquisition unit.

The tire pressure monitoring ECU 31 includes a centripetal component comparator 42 that compares the centripetal component Gr1 obtained when the ignition switch 38 is deactivated and the centripetal component Gr2 obtained when the ignition switch 38 is deactivated. The centripetal component comparator 42 checks whether or not the centripetal component Gr of each of the tire pressure detectors 4a to 4d changes when the ignition switch 38 is deactivated and when the ignition switch 38 is activated. The centripetal component comparator 42 is one example of a characteristic value comparator.

The tire pressure monitoring ECU 13 includes an operation control unit 43 that controls the tire position change detection function based on the comparison result of the centripetal component comparator 42. The operation control unit 43 determines that the tire positions have not been changed if the centripetal component Gr is the same in each of the tires 2a to 2d when the ignition switch 38 is deactivated and activated. In this case, the operation control unit 43 shows the previous tire positions on the display unit 16. The operation control unit 43 determines that the tire positions have been changed if the centripetal component Gr changes in at least one of the tires 2a to 2d when the ignition switch 38 is deactivated and activated. In this case, the operation control unit 43 shows that the tire positions have changed on the display unit 16.

The operation of the tire position change detection function will now be described with reference to FIG. 12.

In step S301, the centripetal component acquisition unit 41 determines from the detection result of the ignition condition monitoring unit 40 whether or not the ignition switch 38 has been deactivated, that is, whether or not the engine of the vehicle 1 has been stopped. When the ignition switch 38 has been deactivated, the centripetal component acquisition unit 41 proceeds to step S302.

In step S302, the centripetal component acquisition unit 41 acquires the centripetal component Gr of the tires 2a to 2d when the ignition switch 38 was deactivated. In this case, when the rotation speed of the tire 2 is low (i.e., just before rotation stops) or null (i.e., rotation stopped), the centripetal component acquisition unit 41 acquires the centripetal component data (centripetal component Gr1) from the tire pressure signal Stp transmitted from each of the tire pressure detectors 4a to 4d.

In step S303, the centripetal component acquisition unit 41 stores in the memory 15 the centripetal component Gr1 of each of the tires 2a to 2d obtained in step S302.

In step S304, the centripetal component acquisition unit 41 determines from the detection result of the ignition condition monitoring unit 40 whether or not the ignition switch 38 has been activated, that is, whether the power of the vehicle 1 has been activated to, for example, ACC ON or IG ON. When the ignition switch 38 has been activated, the centripetal component acquisition unit 41 proceeds to step S305.

In step S305, the centripetal component acquisition unit 41 acquires the centripetal component Gr of the tires 2a to 2d when the ignition switch 38 was activated.

In step S306, the centripetal component acquisition unit 41 compares the centripetal component Gr1 and the centripetal component Gr2. When the centripetal component Gr1 and the centripetal component Gr2 are the same in every one of the tires 2a to 2d, the centripetal component acquisition unit 41 proceeds to step S307. When the centripetal component Gr1 and the centripetal component Gr2 are different in at least one of the tires 2a to 2d, the centripetal component acquisition unit 41 proceeds to step S308.

In step S307, the operation control unit 43 shows the previous values of the tire positions on the display unit 16 in front of the driver seat. When the centripetal forces Gr1 and Gr2 are the same, this indicates that the tire positions have not been changed from before deactivation of the ignition switch 38. In this case, the previous values of the tire positions are shown in the display unit 16.

In step S308, the operation control unit 43 shows the message of "tire positions being determined" on the display unit 16. Alternatively, the display unit 16 may be blank showing no messages.

In step S309, the operation control unit 43 has the tire pressure monitoring ECU 13 execute automatic location determination. Thus, even when any one of the tires 2a to 2d is exchanged with a new tire or the tires 2a to 2d undergo rotation, the correct tire position is reregistered to the tire pressure monitoring ECU 13.

In addition to advantages (1) to (10) of the first and second embodiments, the third embodiment has the following advantage.

(11) The tire pressure monitoring ECU 13 determines whether or not the centripetal component Gr changes when the ignition switch 38 is deactivated and when the ignition switch 38 is activated to determine whether or not the tire positions have changed. Accordingly, the determination of whether or not the tire positions have been changed may be completed within a short period after the ignition switch 38 is activated. Since changes in the tire position may be detected without adding a detector, the structure may be simplified.

A fourth embodiment will now be described with reference to FIGS. 13 to 18. The description will focus on differences from the first to third embodiments.

FIG. 14 is a radio wave transmission sequence of the tire pressure detector 4. Preferably, the pressure detector 4 operates so that a first time period T1 in which radio waves are transmitted and a second time period T2 in which radio waves are not transmitted are alternately repeated. Preferably, the first time period T1 is short, for example, one second. The second time period T2 is long, for example, thirty seconds. In this manner, the tire pressure detector 4 repeats the transmission of radio waves in the limited time of one second in intervals of approximately thirty seconds.

Figure 13:
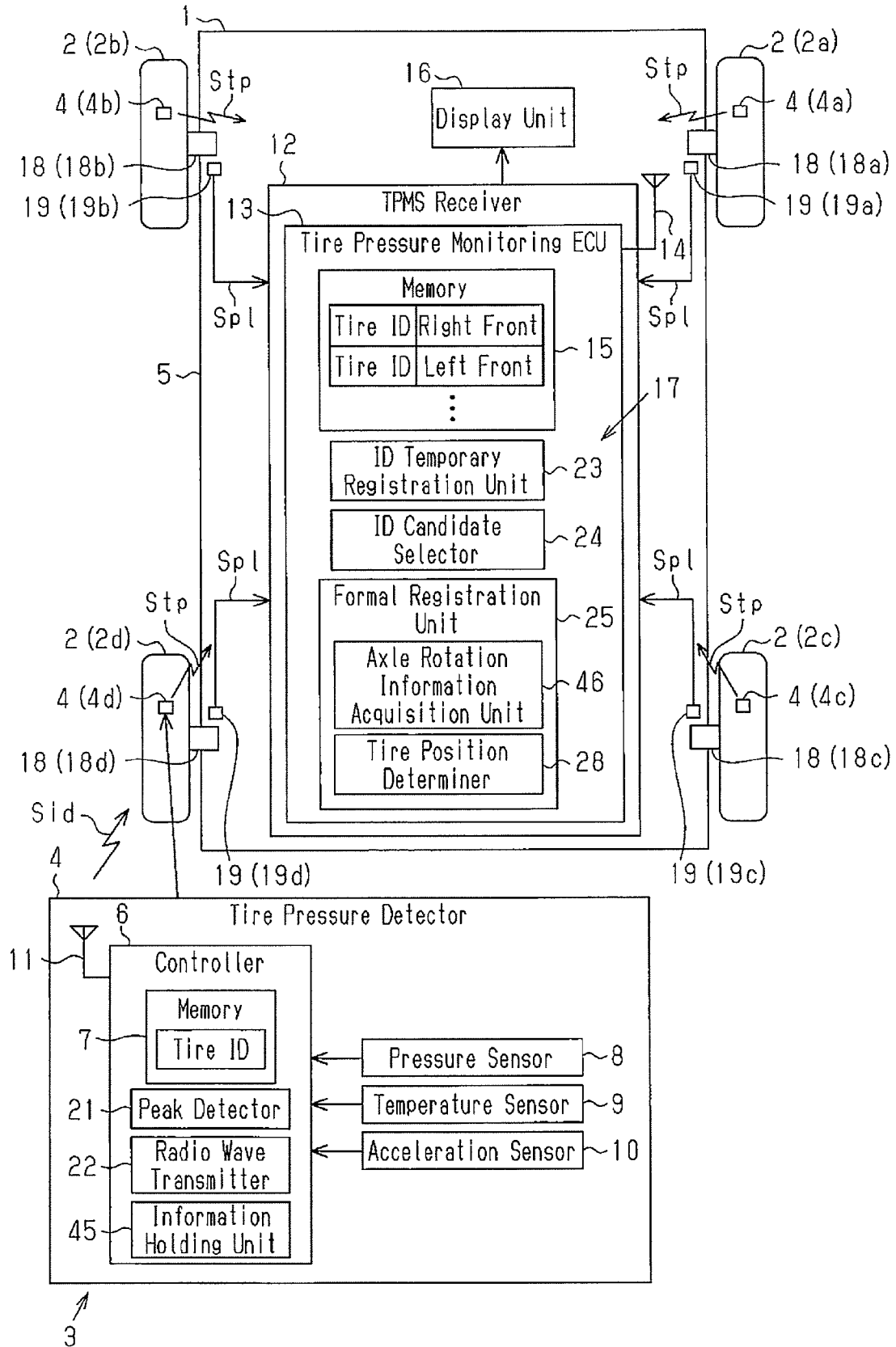
FIG. 13 is a schematic diagram of a fourth embodiment of a tire position determination system.

In FIG. 13, the peak detector 21 detects that the tire pressure detector 4 has reached a specific position (peak position) in the rotation trajectory of the tire 2. The radio wave transmitter 22 transmits a second radio wave (peak ID radio wave Sid) indicating that the tire 2 has reached the specific position. The peak ID radio wave Sid includes at least the tire ID. Preferably, the detection of the peak position and the transmission of the peak ID radio wave Sid are performed a number of times. The peak ID radio wave Sid is performed during the first time period T1.

The tire pressure detector 4 includes an information holding unit 45 that holds at least one piece of specific position information Dtm indicating the timing at which the tire pressure detector 4 reaches a specific position. For example, when the vehicle 1 travels at a low speed and the tire 2 rotates slowly, the peak position may not be detected a predetermined number of times during the short first time period T1. Thus, the tire pressure detector 4 detects the peak position in advance in the second time period T2 during which a radio wave is not transmitted. Further, for example, if the radio wave is transmitted only at a certain determined tire angle, when the radio wave is a null value, the radio wave may be subsequently fixed to the null value. Taking this point into consideration, the tire pressure detector 4 transmits radio waves at a given tire angle. In this case, the radio wave is not fixed to a null value. This avoids risks in which the signal reception rate of the TPMS receiver 12 drastically decreases when determining the tire position.

Preferably, the specific position information Dtm is the peak information indicating the timing the tire pressure detector 4 reaches the peak position. For example, the specific position information Dtm includes a gravitational force sampling number and a gravitational force sampling time interval.

Figure 14A:
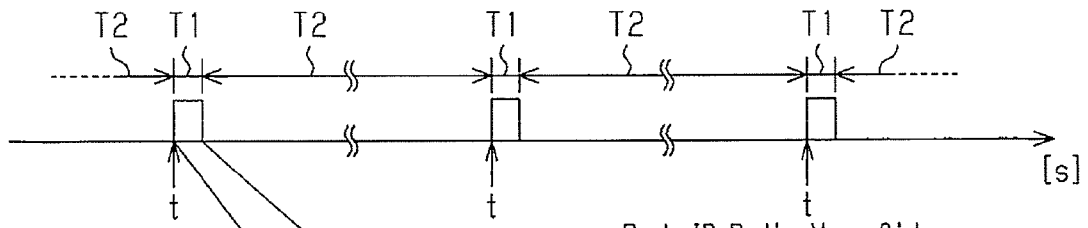
FIGS. 14A and 14B are charts illustrating a communication sequence of a tire pressure transmitter.
Figure 14B:
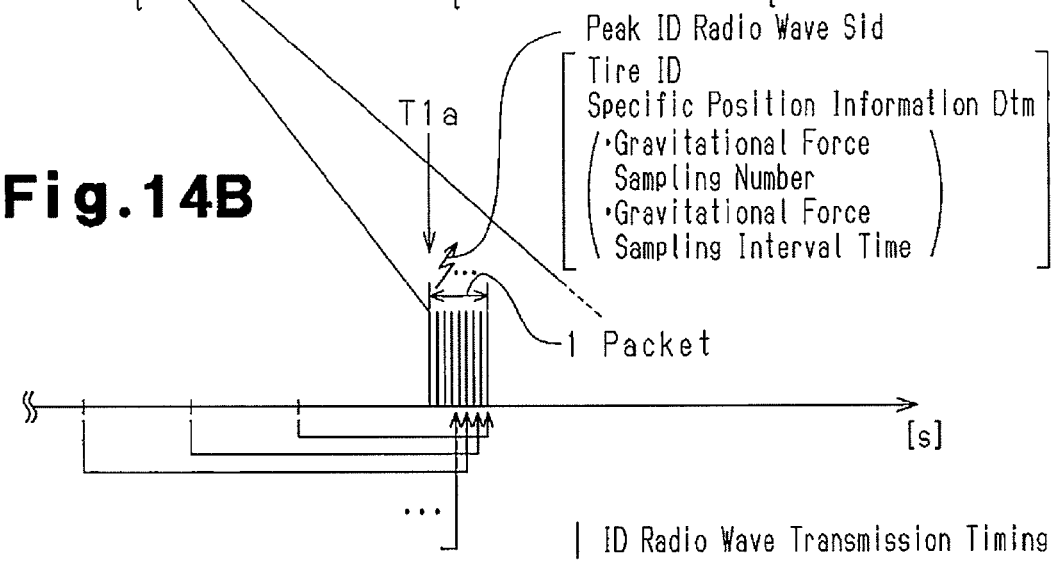

Referring to FIG. 14B, for example, the information holding unit 45 holds the specific position information Dtm indicating that the peak position has been detected a predetermined number of times (e.g., eight times) during the second time period T2 before the starting point Ta1 of the first time period T1. In the first time period T1, the radio wave transmitter 22 transmits at least one piece of specific position information Dtm held by the information holding unit 45 together with the tire ID as a second radio wave (peak ID radio wave Sid). To complete the transmission of a packet of peak ID radio waves Sid within the first time period T1, it is preferable that the radio wave transmitter 22 successively transmit the peak ID radio waves Sid. Each peak ID radio wave Sid may have a time length of, for example, approximately 10 ms and may be repetitively transmitted in intervals of approximately 100 ms.

Referring to FIG. 13, the formal registration unit 25 recognizes that the tire pressure detector 4 has reached the specific position when receiving the second radio wave (peak ID radio wave Sid). The formal registration unit 25 includes an axle rotation information acquisition unit 46. The axle rotation information acquisition unit 46 acquires axle rotation information Dc (pulse count value) whenever the tire pressure detector 4 reaches a specific position from the axle rotation amount sensors 19 (19a to 19d) that detect the rotation of axles 18a to 18d. The tire position determiner 28 collects statistics of the axle rotation information for each tire ID to calculate the distribution of the axle rotation information Dc for tire ID. Based on the distribution of the axle rotation information Dc, the tire pressure detector 4 locates the tires (tire ID) rotating in synchronism with the axles 18a to 18d and determines the tire positions. The distribution includes variation, the deviation mean, and the standard deviation.

The tire position determiner 28 handles plural pieces (eight pieces in the present example) of peak ID radio waves received in a single packet as an independent datum. Whenever receiving the peak ID radio wave Sid, the tire position determiner 28 acquires the axle rotation information Dc from each of the axle rotation amount sensors 19a to 19d. Further, the tire position determiner 28 calculates the distribution of the axle rotation information Dc for each tire ID to determine the position of each tire 2. The tire position determiner 28 back-calculates the axle rotation information Dc for each specific position (peak position) detected in the second time period T2 and held as the specific position information Dtm to determine the tire position from the back-calculated value.

The operation of the tire position determination system 17 will now be described with reference to FIGS. 13 and 15 to 18.

Figure 15:
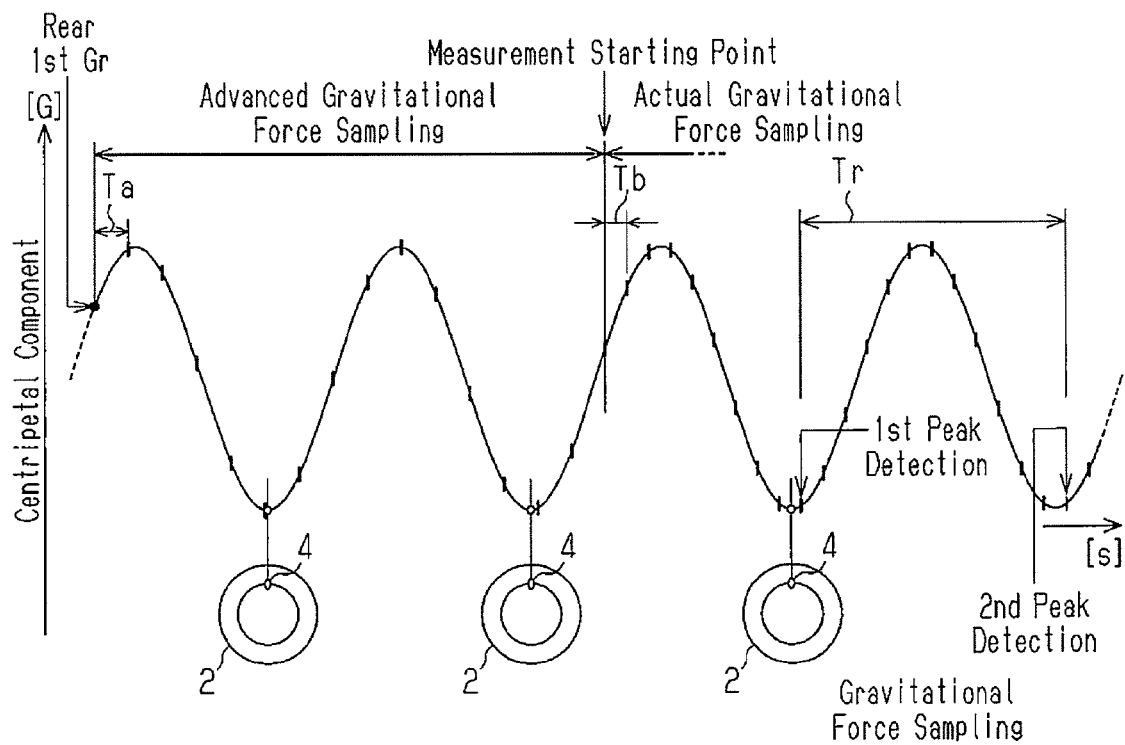
FIG. 15 is a chart illustrating a sampling process of the centripetal component.

Referring to FIG. 15, the tire pressure detector 4 performs advanced gravitational force sampling and checks the fluctuation waveform of the centripetal component Gr. In the advanced gravitational force sampling, the tire pressure detector 4 detects the centripetal component Gr based on the gravitational force sampling time interval Ta, which is set as a relatively long time.

In the advanced gravitational force sampling, the tire pressure detector 4 detects two peaks of the centripetal component Gr and measures a single cycle of the fluctuation waveform of the centripetal component Gr. Then, in accordance with the length of a single cycle of the fluctuation waveform of the centripetal component Gr, the tire pressure detector 4 sets the gravitational force sampling interval time Tb used in the actual gravitational force sampling. The number of gravitational force sampling for each rotation of the tire 2 is set as a specified number (e.g., 12). Accordingly, the gravitational force sampling interval time Tb is set based on the advanced gravitational force sampling so that the gravitational force sampling is actually performed for the specified number of time during a single cycle.

The tire pressure detector 4 repetitively detects the centripetal component Gr of the gravitational force G in the gravitational force sampling time interval Tb and detects peak positions used to determine the tire positions. The time width Tr of a single cycle of the fluctuation waveform of the centripetal component Gr is obtained from the product of the sampling number (12) and the gravitational force sampling interval time Tb.

The information holding unit 45 stores the specified position information Dtm in the memory 7 whenever detecting the peak position during the gravitational force sampling interval time Tb.

Referring to FIG. 14A, in the first time period T1, the radio wave transmitter 22 transmits the sets of (here, 12 sets) of the specified position information Dtm held in the memory 7 and the tire ID as the peak ID radio wave Sid from the transmission antenna 11. That is, the peak ID radio wave Sid includes at least the tire ID and the specified position information Dtm.

More specifically, the peak ID radio wave Sid includes the tire ID, the gravitational force sampling number, and the gravitational force sampling interval time Tb. The gravitational force sampling number corresponds to the sampling number performed during a single cycle of the gravitational force sampling interval time Tb. To complete the transmission of every one of the peak ID radio waves Sid during the first time period T1, the peak radio waves Sid are successively transmitted in short intervals of, for example, 100 ms.

Referring to FIG. 16, the tire position determiner 28 acquires the axle rotation information Dc of each of the axle rotation amount sensors 19a to 19d whenever the peak ID radio wave is received. Further, in the fourth embodiment, the tire position determiner 28 back-calculates the axle rotation information Dc for each piece of specified position information Dtm (peak position). Then, the tire position determiner 28 collects statistics of the specified position information Dt obtained through the back calculation and updates the distribution of the axle rotation information Dc whenever receiving a packet of the peak ID radio waves Sid. For example, as shown in FIG. 16, the tire position determiner 28 updates the distribution of the axle rotation information Dc based on the second packet of peak ID radio waves Sid, the tire positions are specified from the updated distribution. When the tire positions still cannot be specified, the same process is repeated from the third packet and onward to update the distribution and determine the tire positions from the newly updated distribution.

FIG. 17 shows a specific example of tire position determination. The tire position determiner 28 generates a distribution chart 47 for each tire ID as shown in FIG. 17. Preferably, the tire position determiner 28 performs an absolute evaluation, which determines the validity of the distribution using only the axle rotation information Dc of each axle 18, and a relative evaluation, which determines the validity of the distribution using only the axle rotation information Dc of a plurality of the axles 18, to determine the tire positions based on the results of the absolute evaluation and the relative evaluation. In the relative evaluation, the tire position determiner 28 determines whether or not the subject tire has sufficient synchronicity as compared with the other tires. Examples of distribution include deviation mean and standard deviation. The values of deviation and standard deviation become smaller as the determination result becomes more favorable.

The deviation mean is calculated from equation ($\alpha$), which is shown in FIG. 18, where x represents the pulse count value, n represents the total number of the collected pulse count value, and X' represents the mean of the collected pulse count value. The standard deviation is calculated from equation ($\beta$), which is shown in FIG. 18. In the description hereafter, the deviation mean and the standard deviation are both referred to as a bias value. In the absolute evaluation, the tire position determiner 28 determines whether or not the bias value is less than or equal to a threshold. In the relative evaluation, the tire position determiner 28 calculates the difference in bias value between the subject tire and the other tires to determine whether or not the difference in bias value is greater than or equal to the threshold value, that is, whether or not the absolute evaluation of the subject tire is sufficiently smaller than the other tires. When the bias value is less than or equal to the threshold in the absolute evaluation and the difference in the bias value is greater than or equal to the threshold in the relative evaluation, the tire position determiner 28 assumes that the rotation of the tire 2 is in synchronism with the rotation of the axle 18 and specifies the tire position.

In the example of FIG. 17, with regard to the tire ID of ID1, the pulse count value of the left front axle 18b is concentrated in the proximity of 20. In this case, the bias value of the left front axle 18b is within the threshold value. Thus, with regard to ID1, the left front axle 18b satisfies the absolute evaluation. However, with regard to ID1, the pulse count values do not converge to a single value for the right front axle 18a, the right rear axle 18c, and the left rear axle 18d, and the bias values of these axles take adverse values. The difference in the bias value of the left front axle 18b and the bias value of another axle is greater than or equal to the threshold. Thus, the relative evaluation is also satisfied. In this case, the tire position determiner 28 determines that the rotation of the tire 2 of ID1 is in synchronism with the rotation of the left front axle 18b. As a result, the tire 2 of ID1 is specified as the left front tire 2b. The positions of the tires 2 of ID2 to ID4 are specified in the same manner.

If the positions of the four tires 2 cannot be specified in a single determination, the tire position determiner 28 repeats the same process until specifying the positions of all four tires. When the tire position determiner 28 specifies the positions of all four tires 2, the tire position determiner writes the determination result to the memory 15 and updates the tire positions. The process for determining the tire positions may be executed, for example, whenever the ignition switch of the vehicle 1 is activated.

In addition to advantages (1) to (11) of the first to third embodiments, the fourth embodiment has the advantage described below.

(12) Each tire pressure detector 4 transmits to the TPMS receiver 12 a peak ID radio wave Sid indicating that the tire pressure detector 4 has reached the peak position in the rotation trajectory of the tire 2. The TPMS receiver 12 acquires the axle rotation information Dc of each of the axles 18a to 18d whenever receiving the peak ID radio wave Sid from each tire pressure detector 4, and generates statistic data of the axle rotation information for each tire ID. Then, the TPMS receiver 12 generates distribution data of the axle rotation information Dc for each tire ID and determines the tire position from the distribution data. In this manner, a large number of peak ID radio waves Did are collected within a short period and the tire positions may be determined from the distribution data of the axle rotation information Dc. Thus, the tire positions may be accurately directed within a short period.

It should be apparent to those skilled in the art that the present invention may be embodied in many other specific forms without departing from the spirit or scope of the invention. Particularly, it should be understood that the present invention may be embodied in the following forms.

In each embodiment, to accurately detect the peak position, the tire pressure detector 4 may start detecting the centripetal component Gr around an automatic location timing (e.g., t1 and t2) to detect the peak of the centripetal component in predetermined sampling cycles.

In each embodiment, the sampling cycle of the centripetal component Gr may be changed.

In each embodiment, the radio wave used for tire position determination is not limited to the peak ID radio wave Sid. For example, another signal such as the tire pressure signal Stp may be used instead.

In each embodiment, the ID candidate selector 24 may be omitted.

In each embodiment, the temporary registration time may be set to any time other than the time set for the formal registration.

In the fourth embodiment, the specific position information Dtm collected during the second time prior T2 may be transmitted in the first time period T1 at the same time in a batch during the initial radio wave transmission.

In the fourth embodiment, the specific position information Dtm may be transmitted, for example, when the peak position is transmitted or at a timing that is a predetermined time ahead of the starting point T1a of the first time period.

In the fourth embodiment, a weighting value may be added to the peak ID radio wave Sid in accordance with the traveling condition. For example, when the vehicle 1 is traveling at a constant velocity or when the vehicle 1 is traveling at a constant but low velocity, the weighting value of the peak ID radio wave Sid may be increased, and when not, the weighting value of the peak ID radio wave Sid may be decreased. Further, when the vehicle 1 is accelerating, the weighting value may be decreased or the data may be erased. This is further advantageous for correctly determining the tire position.

In each embodiment, the tire position determination timing is not limited. For example, the detector rotation angle θa of each tire pressure detector 4 and the rotation angle of each axle 18 may be calculated based on the two determination timings t1 and t2. In this case, for example, each of the determination timings t1 and t2 may be a timing in which the vehicle 1 stops traveling. In this case, at each of the vehicle stopping timings t1 and t2, each tire pressure detector 4 transmits data including the centripetal component Gr of the gravitational force G as position data to the TPMS receiver 12. The TPMS receiver 12 calculates the first detector angle θk1 (relative rotation angle) of each tire pressure detector 4 from the position data received at the first vehicle stopping timing t1 and calculates the second detector angle θk2 (relative rotation angle) of each tire pressure detector from the position data received at the second vehicle stopping timing t2. Based on the angle θk1 and θk2, the TPMS receiver 12 calculates the detector rotation angle θa of each tire pressure detector 4 that changes between timing t1 and timing t2. Then, the TPMS receiver 12 compares each detector rotation angle θa with the rotation of each axle 18 to determine the tire positions.

In the fourth embodiment, the tire position determination does not have to use the distribution of the axle rotation information Dc of the axles 18a to 18d for each tire ID. For example, a mean value of the axle rotation information of the axles 18a to 18d may be obtained for each tire ID, and the tire synchronized with the mean value may be specified to determine the tire position.

In each embodiment, the sensor that detects the centripetal component Gr of the gravitational force G is not limited to an acceleration sensor.

In each embodiment, the specific position (pole) where the tire pressure detector 4 is detected is not limited to the peak position and may be any characteristic value that allows the position of the tire pressure detector 4 to be specified when the centripetal force Gr changes.

In each embodiment, the characteristic value (first characteristic value and second characteristic value) is not limited to the centripetal component Gr as long as it is a parameter that indicates a value corresponding to the position of the tire pressure detector 4.

The present examples and embodiments are to be considered as illustrative and not restrictive, and the invention is not to be limited to the details given herein, but may be modified within the scope and equivalence of the appended claims.

The invention claimed is:

1. A tire position determination system comprising:
a plurality of tire pressure detectors, each attached to one of a plurality of tires and each capable of transmitting a first radio wave, wherein the first radio wave includes a tire ID and pressure data associated with the tire ID;
a plurality of axle rotation detectors, each corresponding to one of a plurality of axles, wherein each of the axle rotation detectors detects rotation of the corresponding one of the axles and outputs axle rotation information;
a receiver located on a vehicle body of a vehicle, wherein the receiver is capable of receiving the first radio wave from each of the tire pressure detectors; and
a controller that monitors the pressure of each of the tires based on the first radio wave received by the receiver, wherein
each of the tire pressure detectors is configured to detect when reaching a specific position on a rotation trajectory of the corresponding one of the tires and transmit a second radio wave including the tire ID, and
the controller includes
an ID temporary registration unit that temporarily registers, to a memory, tire IDs received from all tire pressure detectors existing in a signal receivable area of the receiver, and
an ID registration unit that receives the second radio wave from each of the tire pressure detectors, acquires the axle rotation information from each of the axle rotation detectors whenever receiving the second radio wave, and specifies a tire ID of a tire that rotates in synchronism with the axle rotation information of each of the axles, from the tire IDs temporarily registered in the memory, to determine a tire position of each of the tires.

2. The tire position determination system according to claim 1, wherein the controller further includes an ID candidate selector that checks whether or not the temporarily registered tire IDs are continuously received when the vehicle is traveling to select a tire ID of which the tire position is to be determined from the temporarily registered tire IDs.

3. The tire position determination system according to claim 1, wherein the ID temporary registration unit is configured to temporarily register all tire IDs received during a certain time.

4. The tire position determination system according to claim 1, wherein the ID temporary registration unit is configured to temporarily register all tire IDs received in a time period during which the ID registration unit is not operating.

5. The tire position determination system according to claim 2, wherein the ID registration unit is configured so that when receiving in regular or irregular intervals, as the vehicle is traveling, a non-selected tire ID that was not selected by the ID candidate selector as a tire ID of which the tire position is to be determined, the ID registration unit determines that the non-selected tire ID is a tire ID of a spare tire.

6. The tire position determination system according to claim 1, wherein the ID registration unit is configured to repetitively perform a tire position determination process for a number of times and formally register tire positions of the tires to the memory when determining that the tire positions of the tires are continuously the same.

7. The tire position determination system according to claim 1, wherein
each of the tire pressure detectors includes
a gravitational force detector that detects the position of the corresponding tire pressure detector,
a specific position detector that detects when the corresponding tire pressure detector reaches the specific position based on a detection signal of the gravitational force detector, and a specific position notification unit that transmits the second radio wave to indicate that the corresponding tire pressure detector has reached the specific portion; and the ID registration unit includes a formal registration unit in the receiver, wherein the formal registration unit is configured to calculate a first relative rotation angle of each of the tire pressure detectors during a first determination period from a first determination timing to when each tire completes a single rotation, calculate a second relative rotation angle of each of the tire pressure detectors during a second determination period from a second determination timing, which is subsequent to the first determination period, to when each tire completes a single rotation, calculate, from the first relative rotation angle and the second relative rotation angle, a detector rotation angle representing a relative rotation angle of each of the tire pressure detectors that changes from the first determination period to the second determination period, and determine the tire position by comparing the detector rotation angle of each of the tire pressure detectors with a rotation angle of each of the axles that changes from the first determination period to the second determination period.

8. The tire position determination system according to claim 1, further comprising:

a plurality of gravitational force detectors, each arranged in one of the tire pressure detectors;

a characteristic value acquisition unit capable of acquiring a characteristic value corresponding to the position of the tire pressure detector based on a detection signal of the corresponding gravitational force detector, wherein the characteristic value acquisition unit is configured to acquire a first characteristic value corresponding to the position of the tire pressure detector when an ignition switch of the vehicle is deactivated, and a second characteristic value corresponding to the position of the tire pressure detector when the ignition switch is activated;

a characteristic value comparator that compares the first characteristic value and the second characteristic value; and an operation control unit that determines whether or not the tire position has changed based on the comparison of the characteristic value comparator.

9. The tire position determination system according to claim 1, wherein:

each of the tire pressure detectors includes a gravitational force detector that detects the position of the corresponding tire pressure detector, a specific position detector that detects when the corresponding tire pressure detector reaches the specific position based on a detection signal of the gravitational force detector, and a specific position notification unit that transmits the second radio wave from the corresponding tire pressure detector at a certain timing; and the ID registration unit includes a formal registration unit configured to calculate a distribution of the axle rotation information of each axle for each of the tire IDs based on a statistic value of the axle rotation information of each axle, and determine the tire position by specifying, based on the distribution, a tire ID of a tire that rotates in synchronism with the axle rotation information of each axle.

10. A tire position determination system comprising:

a plurality of tire pressure detectors, each attached to one of a plurality of tires and each capable of transmitting a first radio wave, wherein the first radio wave includes a tire ID and pressure data associated with the tire ID;

a plurality of axle rotation detectors, each corresponding to one of a plurality of axles, wherein each of the axle rotation detectors detects rotation of the corresponding one of the axles and outputs axle rotation information;

a receiver located on a vehicle body of a vehicle, wherein the receiver is capable of receiving the first radio wave from each of the tire pressure detectors; and a controller that monitors the pressure of each of the tires based on the first radio wave received by the receiver, wherein each of the tire pressure detectors is capable of transmitting position data corresponding to a position on a rotation trajectory of the corresponding one of the tires, and the controller includes an ID temporary registration unit that temporarily registers, to a memory, tire IDs received from all tire pressure detectors existing in a signal receivable area of the receiver, and an ID registration unit that receives the position data from each of the tire pressure detectors, acquires the axle rotation information from each of the axle rotation detectors whenever receiving the position data, and specifies a tire ID of a tire that rotates in synchronism with the axle rotation information of each of the axles, from the tire IDs temporarily registered in the memory, to determine a tire position of each of the tires.

* * * * *